(12) United States Patent
Eim et al.

(10) Patent No.: US 9,436,352 B2
(45) Date of Patent: Sep. 6, 2016

(54) MOBILE TERMINAL AND CORRESPONDING METHOD FOR CONTROLLING DIVIDED ITEMS IN LIST

(71) Applicant: LG ELECTRONICS INC., Seoul (KR)

(72) Inventors: Sanghyun Eim, Seoul (KR); Yunjueng Mhun, Seoul (KR); Namki Kim, Seoul (KR); Choonjae Lee, Seoul (KR); Jiyen Son, Seoul (KR); Joohee Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 14/099,690

(22) Filed: Dec. 6, 2013

(65) Prior Publication Data
US 2014/0282222 A1   Sep. 18, 2014

(30) Foreign Application Priority Data

Mar. 14, 2013 (KR) .......................... 10-2013-0027458

(51) Int. Cl.
*G06F 3/0482* (2013.01)
*G06F 3/0488* (2013.01)
*G06F 3/0485* (2013.01)
*G06F 3/0484* (2013.01)

(52) U.S. Cl.
CPC ........... *G06F 3/0482* (2013.01); *G06F 3/0485* (2013.01); *G06F 3/0488* (2013.01); *G06F 3/04842* (2013.01); *G06F 3/04886* (2013.01); *G06F 2203/04803* (2013.01)

(58) Field of Classification Search
CPC ............. G06F 3/0482; G06F 3/04842; G06F 3/0485; G06F 3/0488; G06F 3/04886; G06F 2203/04803; G06K 9/00026

USPC ......................................................... 715/783
See application file for complete search history.

(56) References Cited

U.S. PATENT DOCUMENTS

| 5,877,760 A | * | 3/1999 | Onda | ..................... G06F 3/0334 715/784 |
| 5,959,626 A | * | 9/1999 | Garrison | ............... G06F 3/0482 715/784 |
| 5,999,176 A | * | 12/1999 | Kamper | ................ G06F 3/0485 715/787 |

(Continued)

OTHER PUBLICATIONS

Anonymous, "Cut your time spent scrolling through Word in half with Split Screen," Feb. 21, 2013, XP55138600, 1 page.

(Continued)

*Primary Examiner* — Kieu Vu
*Assistant Examiner* — Alvaro R Calderon, IV
(74) *Attorney, Agent, or Firm* — Birch, Stewart, Kolasch & Birch, LLP

(57) ABSTRACT

A mobile terminal including a touch screen display configured to display a plurality of items included in a list; and a controller configured to: sense a predetermined-type first touch input with respect to the touch screen display, partition the touch screen display into at least first and second regions in response to the first touch input, display at least some of the items that have been displayed on the touch screen display prior to the sensing of the first touch input, as they are, to the first region, display at least one other item including a first item or a last item in the list to the second region, sense a predetermined-type second touch input different from the first touch input with respect to the touch screen display, and move together the items displayed on the first and second regions in response to the sensing of the second touch input.

19 Claims, 28 Drawing Sheets

(56) References Cited

U.S. PATENT DOCUMENTS

| | | | | |
|---|---|---|---|---|
| 6,225,996 B1* | 5/2001 | Gibb | G06F 17/246 | 715/209 |
| 6,239,803 B1* | 5/2001 | Driskell | G06F 3/0482 | 715/810 |
| 2001/0019338 A1* | 9/2001 | Roth | G06F 3/0482 | 715/811 |
| 2004/0153992 A1* | 8/2004 | Molina-Moreno | G06F 8/35 | 717/105 |
| 2005/0091606 A1* | 4/2005 | Sauermann | G06F 17/212 | 715/788 |
| 2006/0020903 A1* | 1/2006 | Wang | G06F 3/0481 | 715/792 |
| 2006/0095845 A1* | 5/2006 | Van Leeuwen | G06F 3/0485 | 715/700 |
| 2006/0174212 A1* | 8/2006 | Cok | G06F 3/04855 | 715/786 |
| 2006/0174214 A1* | 8/2006 | McKee | G06F 3/0485 | 715/802 |
| 2006/0277488 A1* | 12/2006 | Cok | G06F 3/04855 | 715/784 |
| 2007/0222769 A1* | 9/2007 | Otsuka | G01C 21/3664 | 345/173 |
| 2007/0254722 A1* | 11/2007 | Kim | G06F 3/0485 | 455/566 |
| 2007/0294635 A1* | 12/2007 | Craddock | G06F 3/0485 | 715/784 |
| 2008/0040683 A1* | 2/2008 | Walsh | G06F 3/04855 | 715/786 |
| 2008/0155475 A1* | 6/2008 | Duhig | G06F 3/0482 | 715/830 |
| 2008/0202823 A1* | 8/2008 | Won | G06F 3/0485 | 178/18.01 |
| 2009/0150822 A1* | 6/2009 | Miller | G06F 3/0485 | 715/784 |
| 2009/0183076 A1* | 7/2009 | Shim | G06F 3/0485 | 715/716 |
| 2009/0282360 A1* | 11/2009 | Park | G06F 3/0482 | 715/786 |
| 2010/0023858 A1* | 1/2010 | Ryu | G06F 3/0416 | 715/702 |
| 2010/0083166 A1* | 4/2010 | Happonen | G06F 3/0485 | 715/784 |
| 2010/0248788 A1* | 9/2010 | Yook | G06F 3/0481 | 455/566 |
| 2010/0251152 A1* | 9/2010 | Cho | G06F 1/1626 | 715/765 |
| 2010/0295805 A1* | 11/2010 | Shin | G06F 3/04883 | 345/173 |
| 2011/0057880 A1* | 3/2011 | Kasahara | G06F 3/0482 | 345/158 |
| 2011/0154259 A1* | 6/2011 | Kennedy | G06F 3/0482 | 715/811 |
| 2011/0209101 A1* | 8/2011 | Hinckley | G06F 1/1647 | 715/863 |
| 2012/0036459 A1* | 2/2012 | Pei | G06F 3/04815 | 715/765 |
| 2012/0102430 A1* | 4/2012 | Kobayashi | G06F 3/0481 | 715/784 |
| 2012/0180002 A1* | 7/2012 | Campbell | G06F 17/246 | 715/863 |
| 2012/0304092 A1* | 11/2012 | Jarrett | G06F 3/04883 | 715/765 |
| 2012/0327106 A1* | 12/2012 | Won | G06F 3/0485 | 345/619 |
| 2013/0120464 A1* | 5/2013 | Wei | G06F 3/04842 | 345/672 |
| 2013/0179829 A1* | 7/2013 | Kwon | G06F 3/0488 | 715/784 |
| 2014/0035946 A1* | 2/2014 | Chang | G06F 3/017 | 345/619 |
| 2014/0062925 A1* | 3/2014 | Park | G06F 3/0486 | 345/173 |
| 2014/0062976 A1* | 3/2014 | Park | G09G 5/00 | 345/204 |
| 2014/0215336 A1* | 7/2014 | Gardenfors | G06F 3/017 | 715/719 |
| 2015/0012885 A1* | 1/2015 | Bergdahl | G06F 3/0482 | 715/821 |

OTHER PUBLICATIONS

Anonymous, "Freeze or lock rows and columns—Excel—Office.com," Mar. 7, 2013, XP055139019, 2 pages.

Anonymous, "Statistica Help: Do Statistica Spreadsheets support split display?" Jan. 1, 2012, XP055139030, 1 page.

* cited by examiner

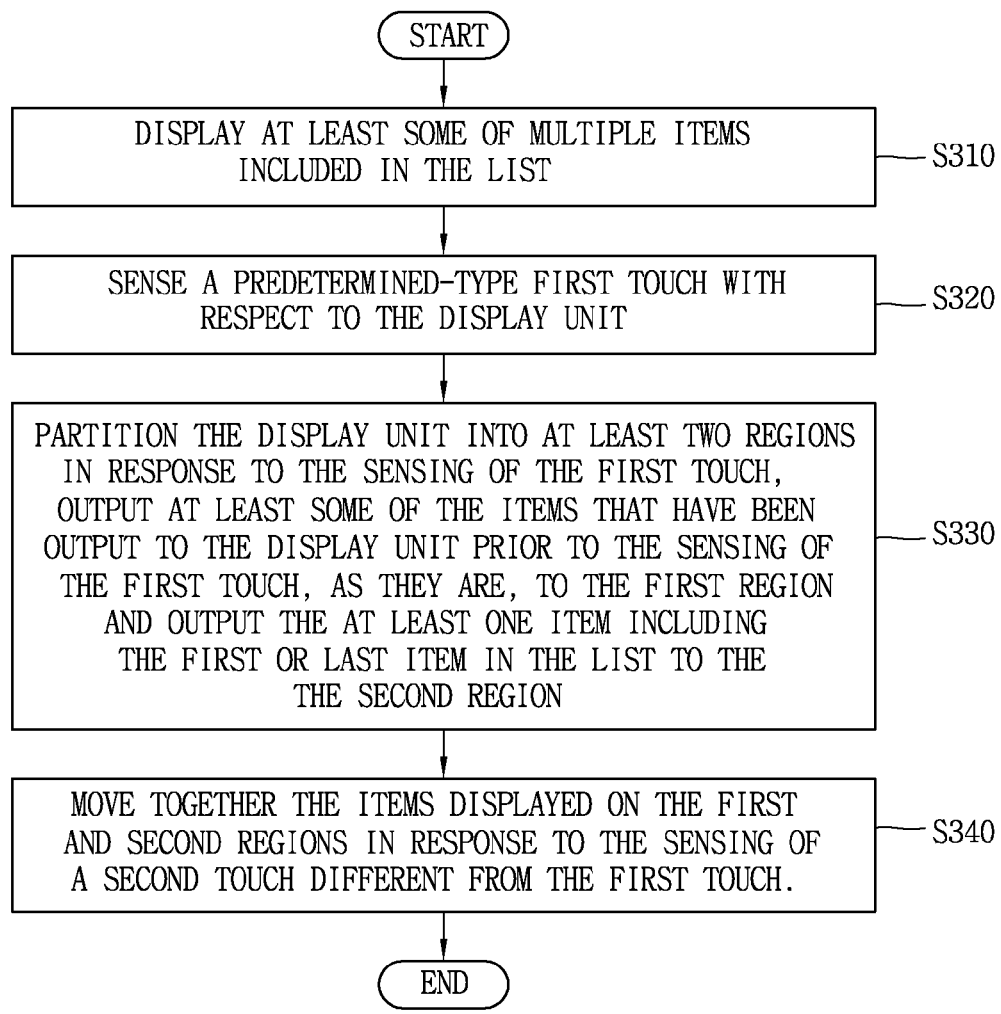

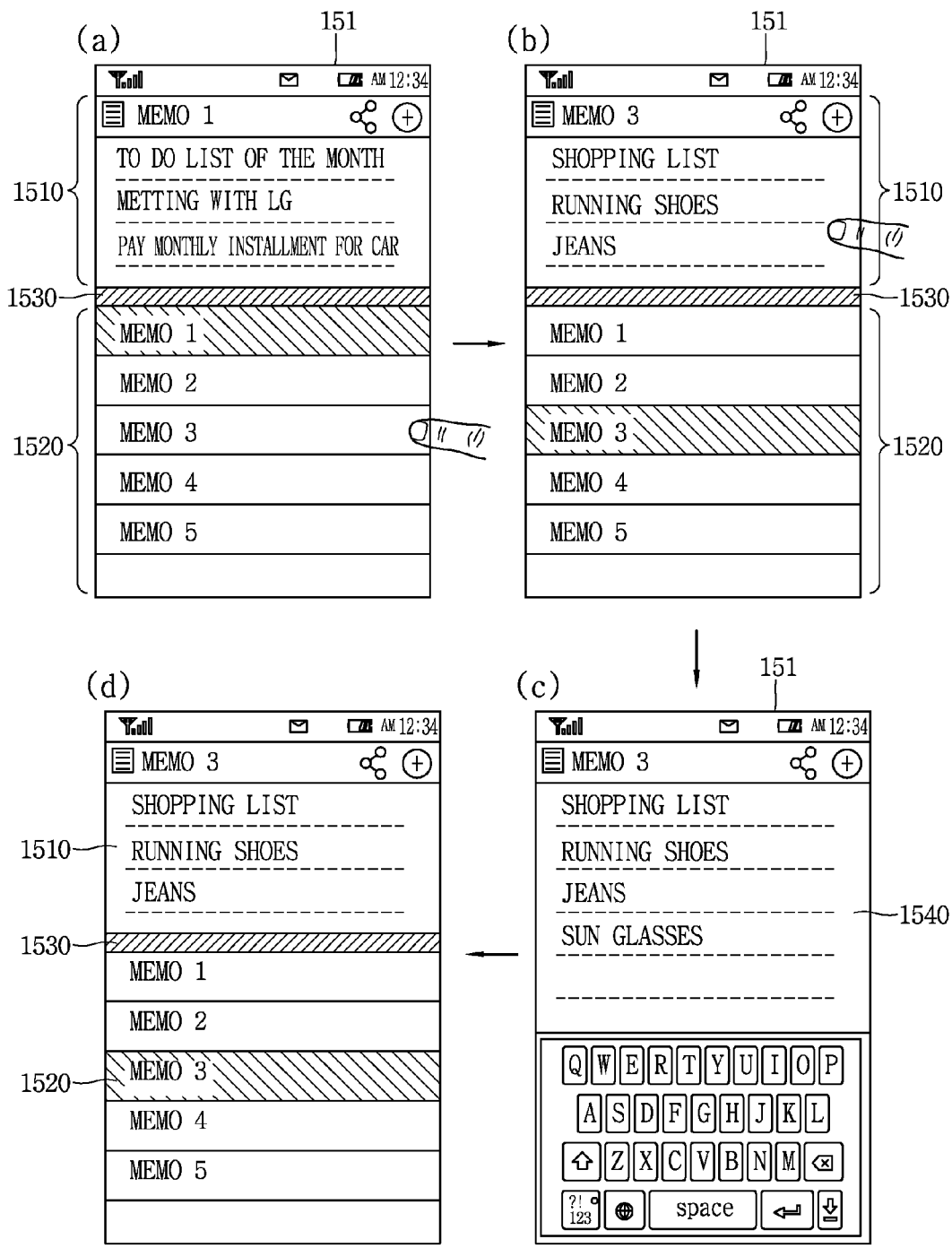

MOBILE TERMINAL AND CORRESPONDING METHOD FOR CONTROLLING DIVIDED ITEMS IN LIST

CROSS-REFERENCE TO RELATED APPLICATION

Pursuant to 35 U.S.C. §119(a), this application claims the benefit of earlier filing date and right of priority to Korean Application No. 10-2013-0027458, filed on Mar. 14, 2013, the contents of which is incorporated by reference herein in its entirety.

BACKGROUND OF THE INVENTION

1. Field of the Invention

The present invention relates to a mobile terminal in which a touch input is possible and a method of controlling the mobile terminal 2. Discussion of the Background A terminal is broadly categorized into a mobile terminal and a stationary terminal. The mobile terminal is further categorized into a handheld terminal and a vehicle-mounted terminal.

In response to an increasing demand for diversified functions, the terminal functions as a multimedia player with multiple functions such as shooting a photographic object as a still image or moving images, reproducing digital audio and video compression files, playing a game, receiving a broadcast or the like.

In addition, the mobile terminal displays various information including a list of items on a small size display. Thus, the user can scroll the displayed list to see items not currently displayed. However, because a large number of items may be included, the scrolling feature is cumbersome and time consuming.

SUMMARY OF THE INVENTION

Therefore, an aspect of the present invention is to provide a mobile terminal in which a list can be controlled more conveniently by using touch input applied to a display unit, and a method of controlling the mobile terminal.

To achieve these and other advantages and in accordance with the purpose of this specification, as embodied and broadly described herein, there is provided a mobile terminal including a display unit that is formed to display at least some of multiple items included in a list with a predetermined length, a sensing unit that senses a predetermined-type first touch with respect to the display unit, and a controller that partitions the display unit into at least two regions in response to the sensing of the first touch, outputs at least some of the items that have been output to the display unit prior to the sensing of the first touch, as they are, to the first region and outputs the at least one item including the first or last item in the list to the second region, in which the controller moves together the items displayed on the first and second regions in response to the sensing of a second touch different from the first touch.

In the mobile terminal, if the items displayed on the first region corresponds to an upper portion of the list, the controller may output the at least one item including the last item in the list, to the second region, and if the items displayed on the first region corresponds to a lower portion of the list, the controller may output the at least one item including the first item in the list, to the second region.

In the mobile terminal, based on the second touch, the controller may replace the at least one of the items included in the first region with the item different from the item included in the first region, and replaces the at least one of the items included in second region with the item different from the item included in the second region, and the different items as a replacement in the first and second regions may be determined depending on a touch direction that corresponds to the second touch.

In the mobile terminal, the controller may make the items included in the first and second regions move around in a circle within a scope of the list, based on the second touch.

In the mobile terminal, if the item included in the first region is the item in the first position in the list, the item in the last position in the list may be output in succession to the item in the first position, in response to the second touch.

In the mobile terminal, sizes of the first and second regions may be determined depending on a position of a point at which the first touch is sensed.

In the mobile terminal, the controller may partition the display unit into the first and second regions, based on the point at which the first touch is sensed, and may determine the number of the items to be displayed on each of the first and second regions, based on the sizes of the first and second regions.

In the mobile terminal, the first touch may be a drag touch input that starts at one point on the display unit and ends at one other point different from the one point, and the controller may control the display unit in such a manner that a graphic object discriminating between the first and second regions is output to a border region between the first and second regions.

In the mobile terminal, the controller may move the graphic object in response to the touch with respect to the graphic object, and sizes of the first and second regions may be changed depending on the movement of the graphic object.

In the mobile terminal, the controller may end the partitioning of the display unit into the first and second regions in response to the movement of the graphic object to a predetermined region on the display unit, and may output the items related to the items that have been output to any one of the first and second regions.

In the mobile terminal when ending the partitioning into the first and second regions, the controller may determine which of the items related to the items that have been output to the first region and the items related to the items that have been output to the second region are output, based on a direction in which the graphic object is moved.

In the mobile terminal, if the first touch is again applied with respect to the display unit when the display unit are partitioned into the first and second regions, the controller may partition the display unit into the first and second regions and a third region.

In the mobile terminal, the second touch may be a drag touch input that is applied to the graphic object, and if the second touch is applied to the graphic object, the controller may move together the items displayed on the first and second regions.

The mobile terminal, if the touch input is applied to any one of the first and second regions, only the items displayed on the region to which the drag touch input is applied may be moved and the items displayed on the region to which the drag touch input may not be applied are output, as they are.

In the mobile terminal, a control icon that controls a movement of the items displayed on the first and second regions may be output to the graphic object, and even though the second touch is applied with respect to the graphic object, the controller may move only the items displayed on any one of the first and second regions in response to a control command with respect to the control icon.

In the mobile terminal, if any one of the items included in the first and second regions, detailed information on the selected item may be output, and if a control command for returning to the list is received when the detailed information is output, the first and second regions that have been output prior to the outputting of the detailed information may be again output.

In the mobile terminal, the detailed information may be output to the region corresponding to any one of the first and second regions, and the at least one item may continue to be output on the region to which the detailed information is not output.

The mobile terminal, if the selected item is the item that is included in the first region of the first and second regions, the detailed information may be output to the second region.

To achieve these and other advantages and in accordance with the purpose of this specification, as embodied and broadly described herein, there is provided a method of controlling a mobile terminal including displaying at least some of multiple items included in a list with a predetermined length, sensing a predetermined-type first touch with respect to the display unit, partitioning the display unit into at least two regions in response to the sensing of the first touch, outputting at least some of the items that have been output to the display unit prior to the sensing of the first touch, as they are, to the first region and outputting the at least one item including the first or last item in the list to the second region, and moving together the items displayed on the first and second regions in response to the sensing of a second touch different from the first touch.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 3 is a flowchart illustrating a method of displaying a widget page in the mobile terminal according to one embodiment of the present invention;

FIGS. 14A and 14B, FIGS. 15A-15D, FIGS. 16A-16C, FIGS. 17A-17C, and FIGS. 18A and 18B are diagrams illustrating a specific embodiment in the mobile terminal according to one embodiment of the present invention.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, a slate PC, a tablet PC, an ultra book, etc. However, it will be obvious to those skilled in the art that the present invention may be also applicable to a fixed terminal such as a digital TV and a desktop computer, except for specific configurations for mobility.

Figure 1:
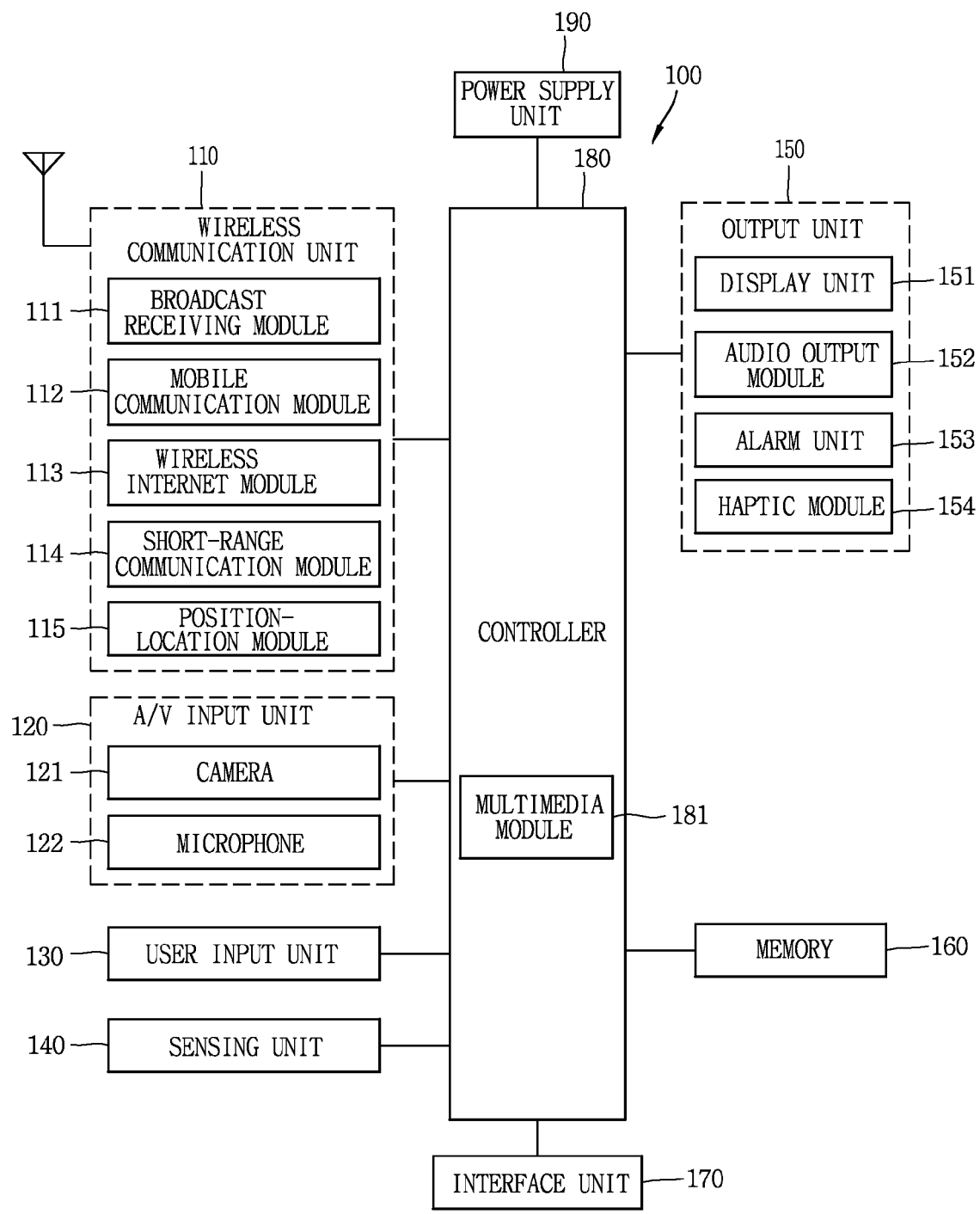
FIG. 1 is a block diagram illustrating a mobile terminal according to one embodiment of the present invention.

FIG. 1 is a block diagram of a mobile terminal according to an embodiment of the present invention. As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this instance, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may comprise a proximity sensor 141, a 3D touch sensing unit 142, an ultrasonic sensing unit 143 and a camera sensing unit 144. The sensing unit 140 may be configured as a 3D sensor for sensing a position of an object which moves in a 3D space (hereinafter, will be referred to as an 'object to be sensed'). The object to be sensed may be a user's body (finger), an accessory device, etc.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure. Here, the touch object is an object to apply touch to the touch sensor, which may be a finger, a touch pen, a stylus pen, a pointer, etc.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this instance, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) perforated in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the than of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or at in of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
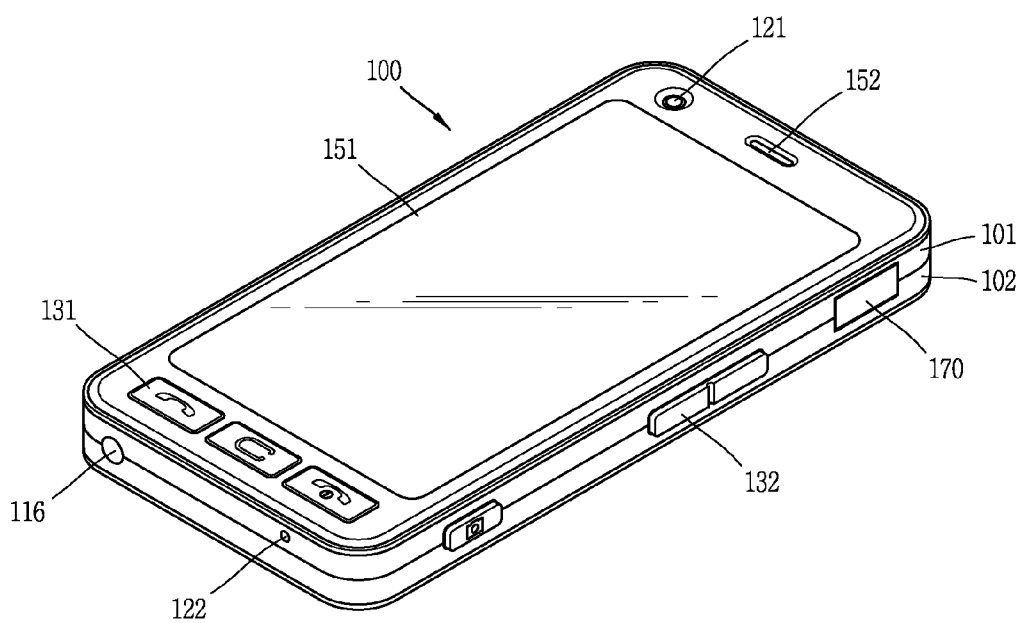
FIGS. 2A and 2B are perspective views illustrating one example of the mobile terminal according to one embodiment of the present invention when viewed from the front side and from the rear side, respectively.
Figure 2B:
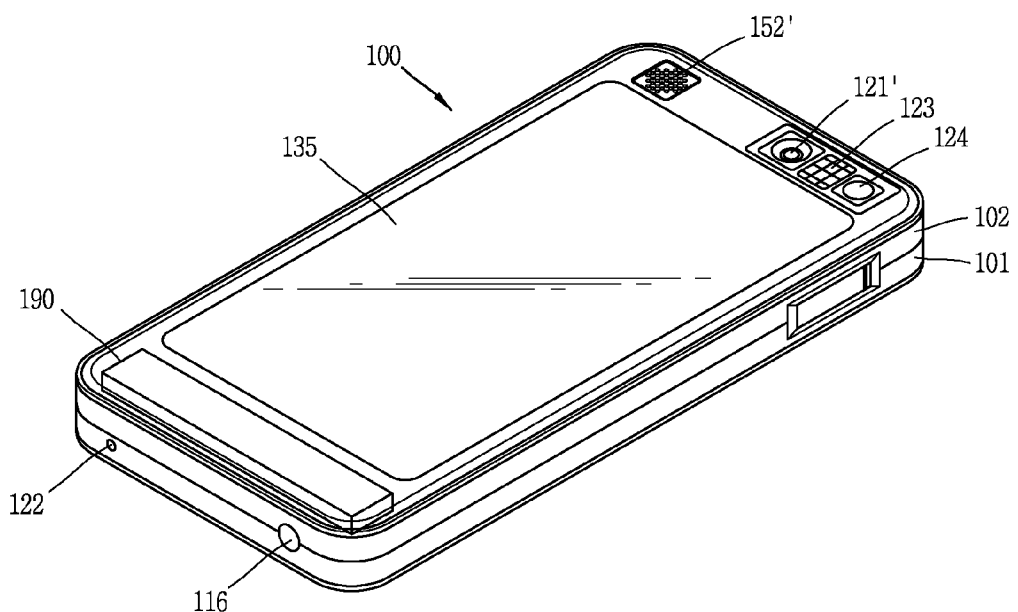

FIG. 2A is a front perspective view of the mobile terminal according to an embodiment of the present invention, and FIG. 2B is a rear perspective view of the mobile terminal according to an embodiment of the present invention The mobile terminal 100 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this instance, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

In addition, in the mobile terminal according to one embodiment of the present invention, in which the inclusion of at least one of the constituent elements described above is possible, the controller 180 outputs a list having a predetermined length to the display unit 151. The list is configured from at least one item. As such, the list that is output to the display unit 151 is not given any limitation. For example, there are various types of lists, such as a contact information list corresponding to a phone book, a mail list, a message list, a photograph list in a photograph album, a phone call log, a list available on an execution screen of an application and the like.

On the other hand, if the list is long in length, that is, if the items included in the list is many, the entire list is not output on a screen of the display unit 151, and some of the items included in the list are output. Then, the controller 180 replaces at least one of the items that are output to the display unit 151, with the different item, based on a control command received through a touch input applied to the display unit 151 or an input unit other than the touch input applied to the display unit 151. That is, a user can use the items that he/she wants from the list by applying an input that corresponds to the control command that replaces at least one of the items that are output to the display unit 151, with the different item.

Further, if many of the items are included in the list, the user founds an inconvenience of applying many times an input corresponding to the control command for moving the item in order to display the item that he/she wants, on the display unit 151. In addition, if the use does not know in which part of the list the item that he/she wants to use is included, he/she will experience difficulty finding the item that he/she wants to use. In addition, in the related art, there is a problem in that even though the user want to use the item that is not output to the display unit 151, as well as the item that is currently output to the display unit 151, he/she always has to make the currently-output item disappear from the display unit 151 in order to output the item that is not output to the display unit 151.

As a solution to such a problem, the mobile terminal and a method of controlling the mobile terminal according to one embodiment of the present invention provide a method to make efficient use of the list by partitioning the list into multiple regions.

The method to control the list in response to the touch applied when the list is output to the display unit 151 is described in detail below, referring to the accompanying drawings. FIG. 3 is a flowchart illustrating displaying of a widget page in the mobile terminal according to one embodiment of the present invention. In addition, FIGS. 4A-4D are diagrams illustrating a control method corresponding to the flowchart of FIG. 3.

First, in the mobile terminal according to one embodiment of the present invention, at least some of the multiple items included in the list having a predetermined length proceeds are displayed (S310). Here, the multiple items are not necessarily included in a list and a single item may be included. In addition, the length of the list varies depending on the list that is output to the display unit 151.

In addition, the list is output to the display unit 151, based on a user's selection (for example, a user's request for outputting of the contact information item). Thus, a predetermined first touch with respect to the display unit 151 is sensed when at least one part of the list is output to the display unit 151 (S320). Here, the predetermined first touch is realized in various ways. For example, the first touch may be a drag touch that is applied with respect to the display unit 151, in a predetermined direction, or may be a long touch that lasts for a predetermined time or more. In addition, the first touch may be the drag touch that is applied with respect to at least two points (for example, using user's two fingers) on the display unit 151.

If the first touch is sensed, the display unit 151 is partitioned into at least two regions in response to the sensed first touch, and at least some of the items that have been displayed on the display unit 151 prior to the sensing of the first touch are output as they are to a first region of at least two regions that result from the partitioning and at least one item including the first item or the last item in the list is output to the first region and the second region (S330).

That is, the controller 180 partitions the display unit 151 into the multiple regions in response to the first touch, and outputs the items, which belong to different groups, to each of the multiple regions. Further, the overlapping items may be displayed on the multiple regions, depending on the number of the items that are included in the list.

In addition, if the item displayed on the first region corresponds to an upper portion of the list, the controller 180 outputs at least one item including the last item in the list, to the second region.

In addition, if the items displayed on the first region correspond to a lower portion of the list, the controller 180 outputs at least one item including the first item in the list, to the second region. That is, the controller 180 determines the item to be displayed on the second region, depending on which portion of the list the item displayed on the first region corresponds to. In this manner, the controller 180 provides the user with the items in the various groups by outputting the items, which belong to different groups, to the multiple regions.

Figure 4A:
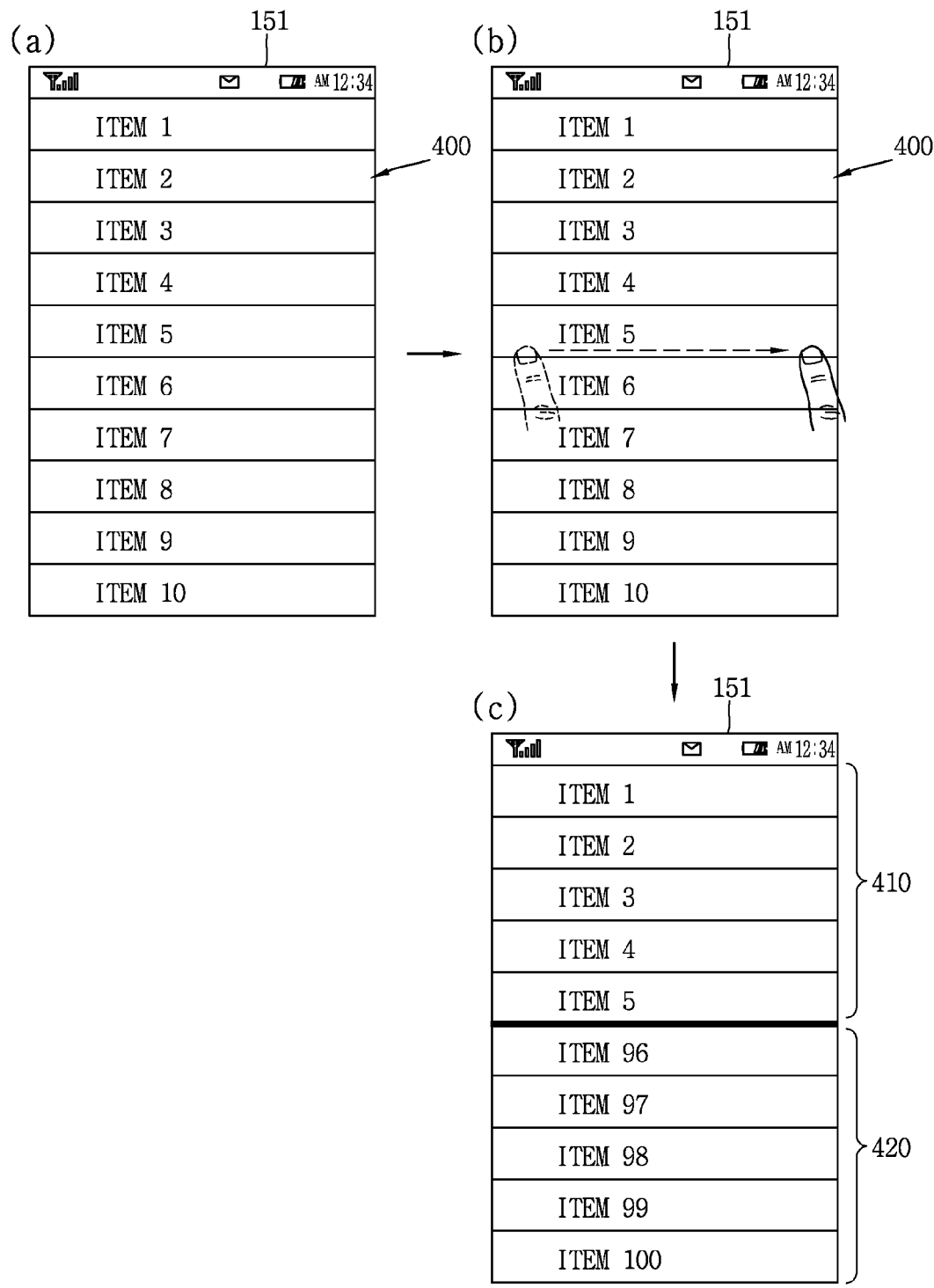
FIGS. 4A-4D are diagrams illustrating a control method corresponding to the flowchart of FIG. 3.

For example, as illustrated in FIG. 4A(a), at least some (items 1 to item 10) of the items included in the list are displayed on the display unit 151. When at least one part of the list is output, if the predetermined first touch, as illustrated in FIG. 4A(b), is applied with respect to a border between the item 4 and the item 5, the controller 180, as illustrated in FIG. 4A(c), partitions the display unit 151 into at least two regions, for example, the first region 410 and the second region 420.

The detail of what is included in the list varies depending on a type of list, such as the contact information list, and the mail list, what is output to the display unit 151 is referred to as the "item" throughout the present specification. Accordingly, the term "item" throughout the present specification is used to mean the thing included in the list or the thing output to the display unit 151.

Then, the controller 180 outputs some (the items 1, 2, 3, 4, and 5) of the items that have been output to the display unit 151 prior to the applying of the first touch, to the first region 410 of the multiple regions that result from the partitioning, and outputs at least one item (items 96, 97, 98, 99, or 100), which belong to a group different from a group to which the items output to the display unit 151 prior to the applying of the first touch belong, to the second region 420 of the multiple regions that result from the partitioning.

For example, if at least one part of the list including the 100 items is in a state of being output to the display unit 151 and the items corresponding to the upper portion of the list are being output to the displayed unit 151, the controller 180 outputs the items corresponding to the lower portions of the list, to the second region, in response to the first touch.

Further, the user can selectively determine whether which portion of the display unit 161 is defined as the first region, that is, whether the upper portion of the display unit 151 is set to the first region or the lower portion is set to the first region. That is, since at least some of the items that have been output to the display unit 151 prior to the displaying of the first touch is output to the first region, the determining of whether the items output to the upper portion are output as they are, or whether the items output to the lower portion are output as they are may be important for the user.

That is, the controller 180 may output the items that have been output to the portion corresponding to the first region 410 prior to the partitioning of the display unit 151 into the first and second regions 410 and 420, to the first regions 410, as they are. Also, if the display unit 151 is partitioned into the multiple regions, the controller 180 may visually discriminate the borders between the multiple regions.

Further, when the display unit 151 is partitioned into the first and second regions, as described in Step S330, the items displayed on the first and second regions are moved in response to the sensing of a second touch, different from the first touch, with respect to the display unit 151 (S340). That is, the controller 180 searches for the items belonging to the different groups, more speedily, by moving together the items included in the first and second regions.

Figure 4B:
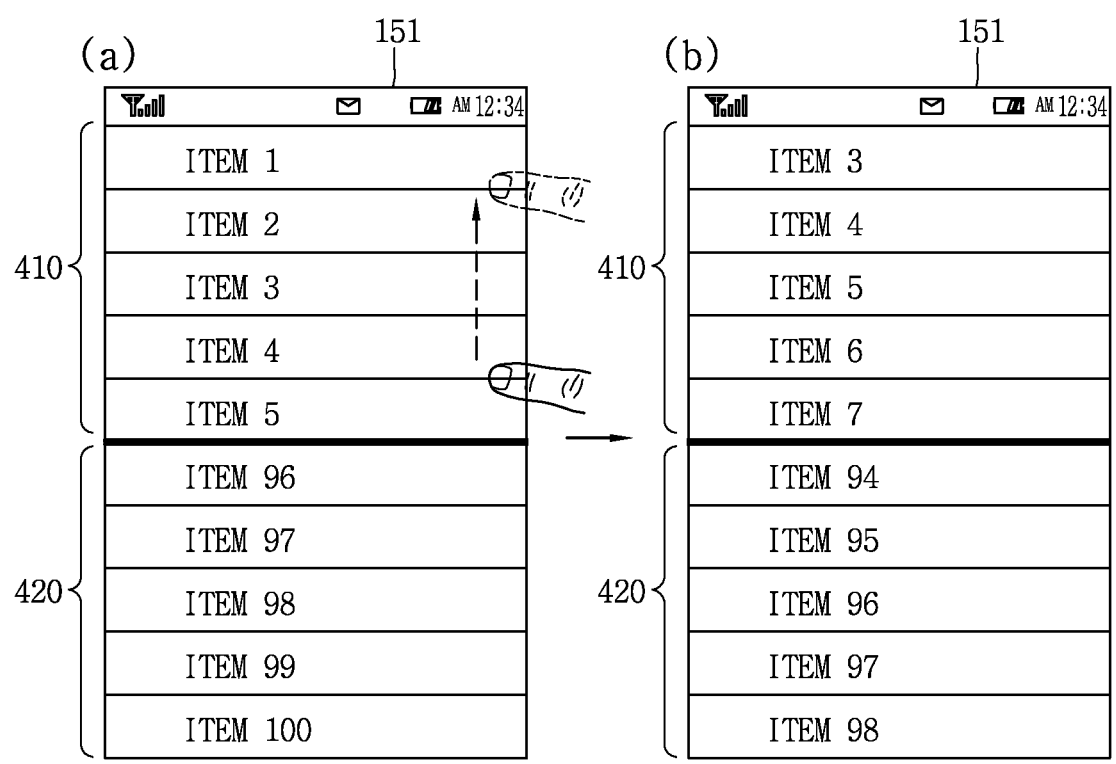

For example, if the second touch, as illustrated in FIG. 4B(a), is applied with respect to the first region 410, the controller 180, as illustrated in FIG. 4B(b), replaces at least one of the items displayed on the first region 410 with the different one, and replaces at least one of the items displayed on the second region 420 with the different one. The second touch here may be a drag touch that is applied corresponding to a direction (for example, in a longitudinal direction) in which the items are arranged.

In addition, even though the second touch is applied with respect to the second region 420, the controller 180 replaces at least one of the items displayed on the first region 410 with the different one, and replaces at least one of the items displayed on the second region 420 with the different one.

Thus, based on the second touch, the controller 180 replaces at least one (for example, the items 1 and 2) of the items included in the first region 410 with the different one (the items 6 and 7) included in the first region 410, and replaces at least one (for example, the items 99 and 100) of the items included in the second region 420 with the different one (the items 94 and 95) included in the second region 420. Further, the different item as a replacement in each of the first and second regions 410 and 420 is determined depending on a touch direction that corresponds to the second touch.

Also, the controller 180 makes the items included in the first and second regions 410 and 420 move around in a circle within a scope of the list. For example, if the item included in the first region 410 is the item in the first position (for example, the item 1) in the list, the item in the last position (for example, the item 100) in the list is output in succession to the item in the first position (for example, the item 1), in response to the second touch.

The mobile terminal according to the present invention provides a function of searching the list more sufficiently by moving together the items included in the multiple regions. In addition, the controller 180 does not always move together the multiple items. The controller 180 may move only the item included in any one of the regions. This is specified in the embodiment described below.

Figure 4C:
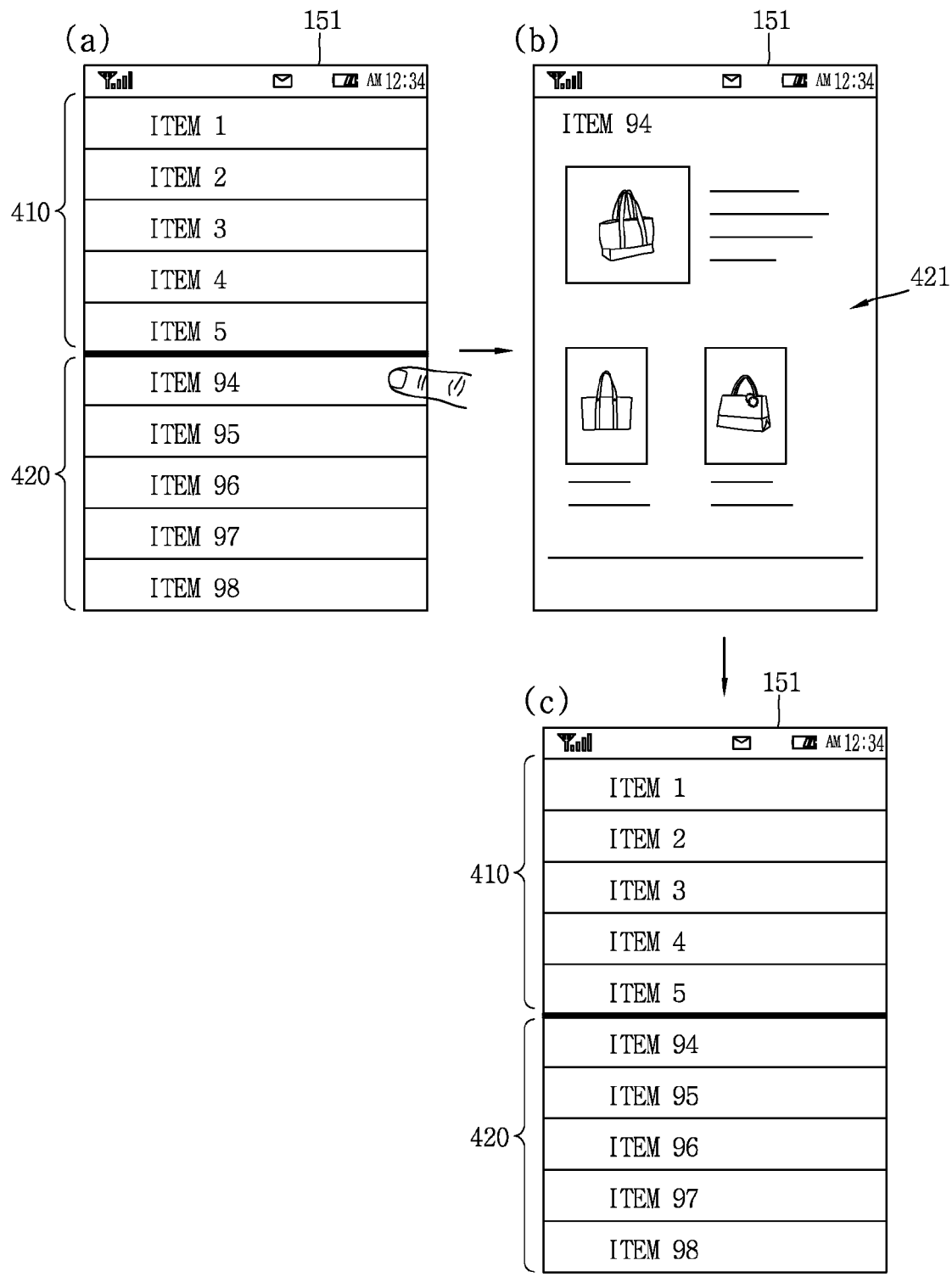

In the mobile terminal according to one embodiment of the present invention, if any one (for example, the item 94)

of the items, as illustrated in FIG. 4C(a), is selected, the controller 180, as illustrated in FIG. 4C(b), outputs detailed information 421 corresponding to the selected item. Then, if the control command for returning to the list is received when the detailed information is output, the controller 180, as illustrated in FIG. 4C(c), again outputs the list, partitioned into the first and second regions 410 and 420, which have been output prior to the outputting of the detailed information.

Furthermore, the controller 180 ends grouping the items included in the list into the multiple regions in response to the predetermined-type touch with respect to the display unit 151 and then outputting the result. Here, the predetermined-type touch for canceling the partitioning into the regions may be a touch corresponding to the first touch. For example, if the first touch is a drag touch that is applied from left to right, the predetermined-type touch for the canceling, as illustrated in FIG. 4D(a), is a drag touch that is applied from right to left.

In addition, only if the predetermined-type touch for the canceling is sensed in a border region (for example, a region between the item 4 and the item 96) between the first and second regions 410 and 420, the portioning into the first and second regions 410 and 420 can be canceled.

Figure 4D:
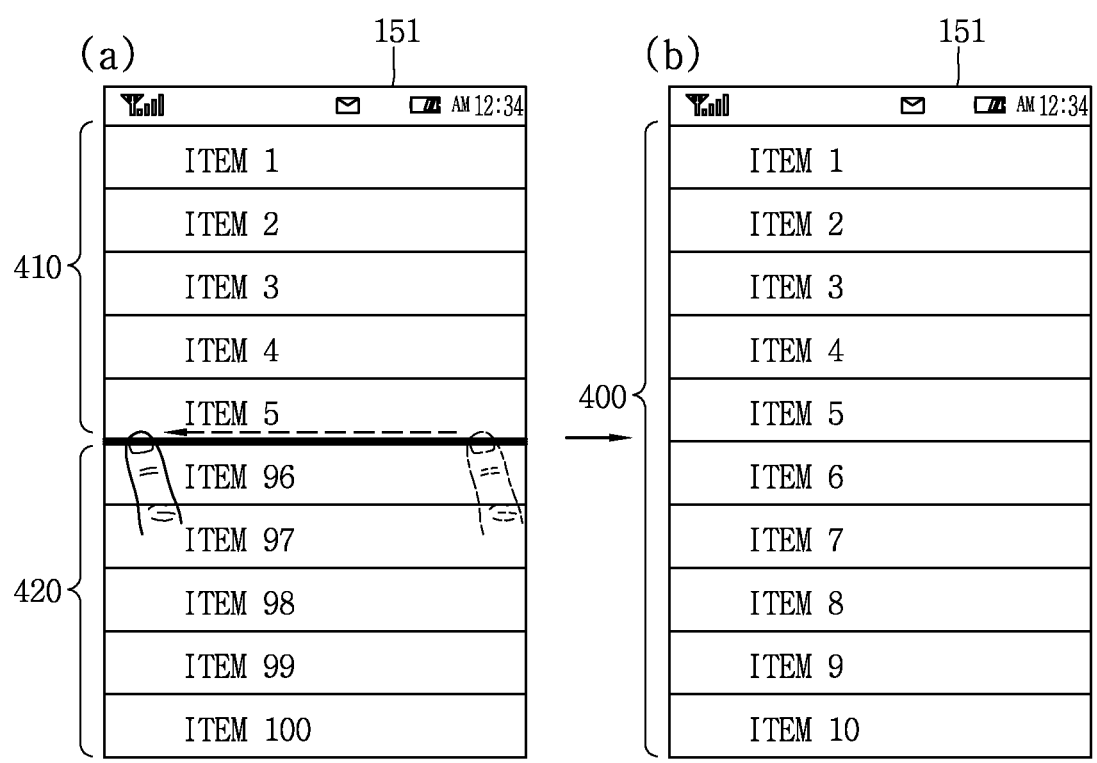

If the partitioning into the regions is canceled, the items sequentially arranged are output to the display unit 151 as illustrated in FIG. 4D(b). Further, if the partitioning into the regions is canceled, the items included in any one of the first and second regions 410 and 420 are output as they are. For example, if the partitioning into the regions, as illustrated in FIGS. 4D(a) and 4D(b), is canceled, the items 1, 2, 3, and 4 that have been output to the first regions 410 are output as they are, to the display unit 151, and the items related to the items that have been output to the first regions 410 are output to the display unit 151. Here, the "related items" are the items that correspond to the order in which the items are arranged in the list.

In addition, when the partitioning into the regions is ended, whether or not the items included in any one of the regions are output, as they are, is determined depending on a user's selection. Further, the items displayed on the display unit 151 are the same in size (or height, or longitudinal height) regardless of the position in which the items are displayed. Then, unlike the size, spaces between the items output to the display unit 161 vary depending on the positions in which the items are displayed.

Figure 2C:
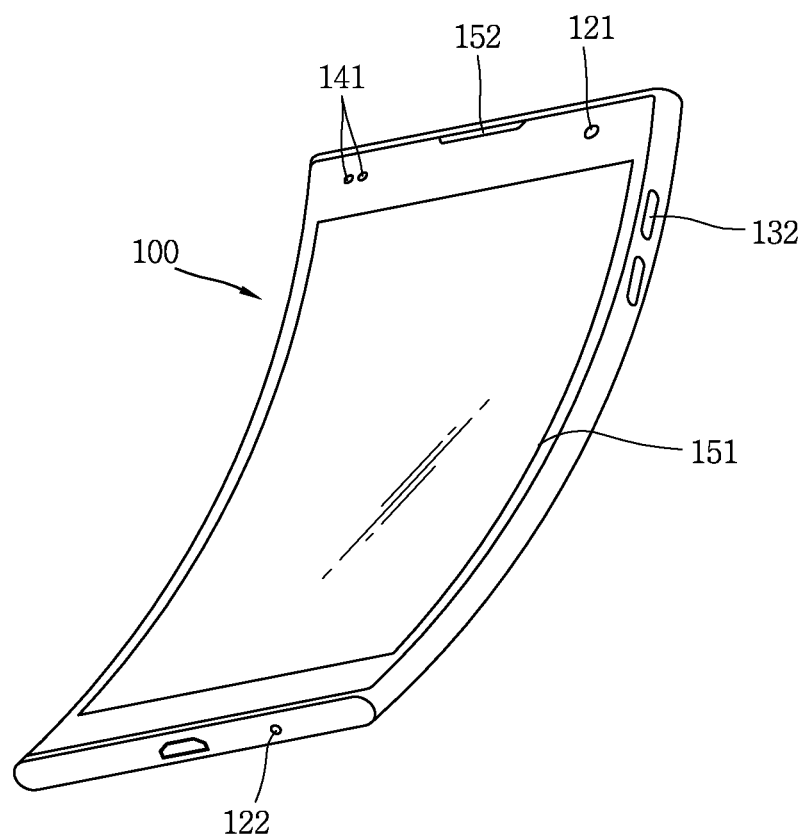
FIG. 2C is a perspective view illustrating another example of the mobile terminal according to the one embodiment of the present invention.

For example, the height of the item displayed on the middle of the display unit 151 is greater than the height of the item displayed on the ends of the display unit 151. In this instance, as the items are moved away from the middle of the display unit 161 toward the end, the heights of the multiple items are gradually decreased. That is, because the middle of the curved display unit 151, as illustrated in FIG. 2C, are relatively better in visibility than the ends, the controller 180 can display the information positioned in the middle in a manner that emphasizes it.

In the embodiment described above, the items included in the same list are displayed on the multiple regions, but, in the mobile terminal according to one embodiment of the present invention, the items included in the different lists are displayed on the multiple regions. The list displayed on the multiple regions can be selected by the user, and, furthermore, the control unit 180 automatically provides the list related to the currently-output list to the regions that result from the partitioning.

As described above, in the mobile terminal and the method of controlling the mobile terminal according to one embodiment of the present invention, the display unit is partitioned into the multiple regions, and the items, which belong to different groups, of the items included in the list are output to each of the multiple regions that result from the partitioning. Accordingly, at a glance, the user can recognize the items, which belong to different groups, through the multiple regions.

Figure 5A:
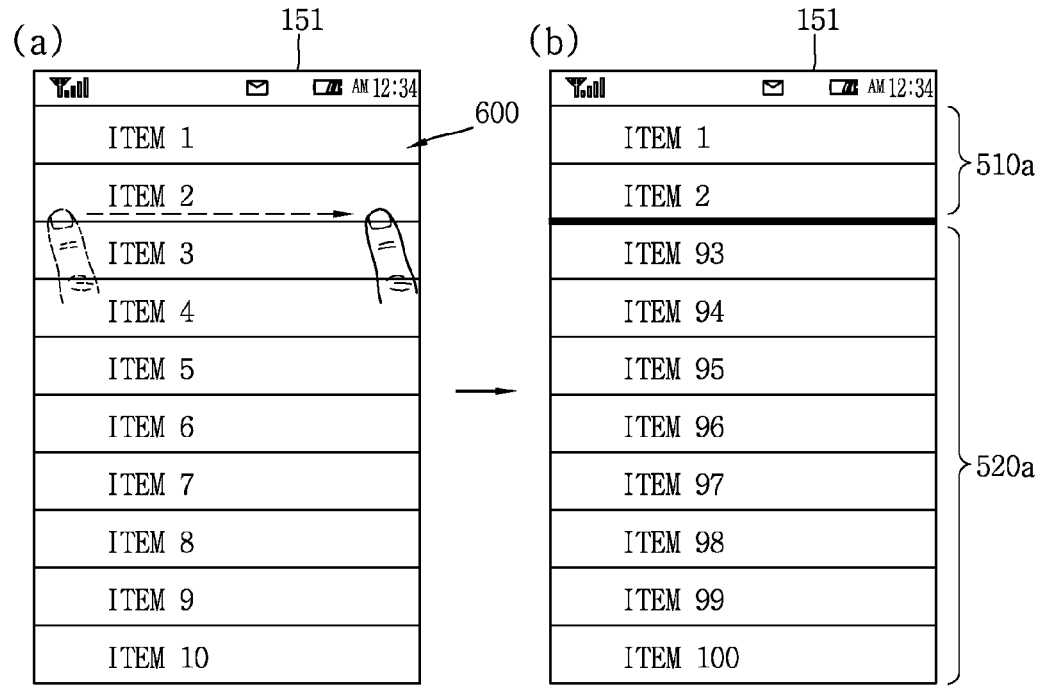
FIGS. 5A and 5B are diagrams illustrating a method of dividing a region into different sizes in response to a touch input in the mobile terminal according to one embodiment of the present invention.
Figure 5B:
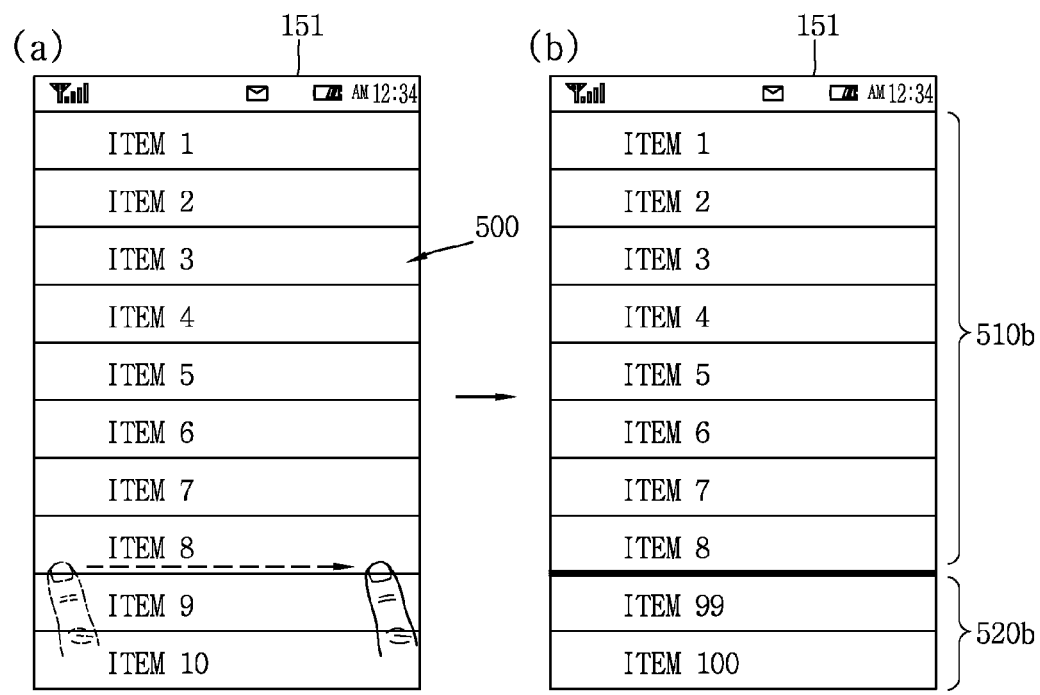

Next, FIGS. 5A and 5B are diagrams illustrating a method of dividing a region into different sizes in response to a touch input in the mobile terminal according to one embodiment of the present invention;

As described above, in the mobile terminal according to one embodiment of the present invention, the display unit is partitioned into the first and second regions, based on the first touch applied to the display unit, and the items, which belong to different groups, in the list, are output to each of the regions. In this instance, the controller 180 adjusts the sizes of the first and second regions differently depending on which region of the display unit the first touch is applied to.

That is, the sizes of the first and second regions are determined depending on a position of a point at which the first touch is sensed. For example, if the first touch is a drag touch input that is applied to the border region between the items, the controller 180 defines the first and second regions based on the border region to which the first touch is applied.

For example, if the first touch, as illustrated in FIG. 5A(a), is applied to the border region between the items 2 and the item 3, the controller 180, as illustrated in FIG. 5A(b), defines a first region 510*a* and a second region 520*a* based on the point to which the first touch is applied. Accordingly, the items 1 and 2 are displayed on the first region 510*a* and the items 93, 94, 95, 96, 97, 98, 99, and 100 are displayed on the second region 520*a*.

Also, if the first touch, as illustrated in FIG. 5B(a), is applied to the border region between the items 7 and the item 8, the controller 180, as illustrated in FIG. 5B(b), defines a first region 510*b* and a second region 520*b* based on the point to which the first touch is applied. Accordingly, the items 1, 2, 3, 4, 5, 6, 7 and 8 are displayed on the first region 510*b* and the items 99 and 100 are displayed on the second region 520*b*.

Further, the controller 180 makes the sizes of the regions variable by flexibly discriminating between the regions based on the point to which the touch is applied. Also, the controller 180 determines the number of the items to be displayed on each of the first and second regions, based on the sizes of the first and second regions.

A graphic object discriminating the border between the multiple regions is described in detail below, referring to the accompanying drawings. In particular, FIGS. 6A-6D are diagrams illustrating the graphic object discriminating a border between regions in the mobile terminal according to one embodiment of the present invention.

Figure 6A:
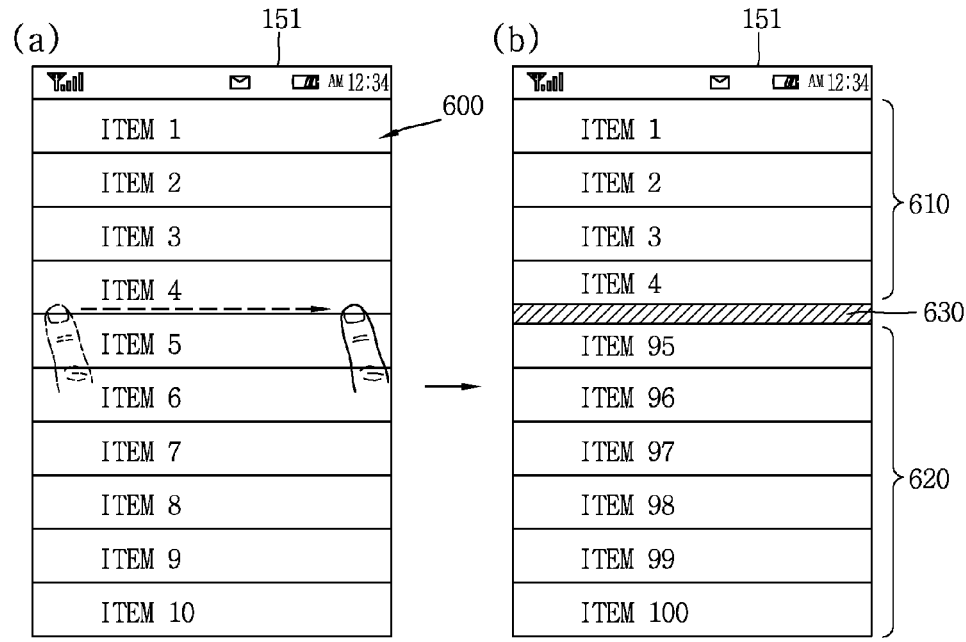
FIGS. 6A-6D are diagrams illustrating a graphic object discriminating a border between regions in the mobile terminal according to one embodiment of the present invention.

If the first touch, as illustrated in FIG. 6A(a), is applied to the border between the items when the list is output, the controller 180, as illustrated in FIG. 6A(b), outputs a graphic object 630 discriminating between first and second regions 610 and 620 that result from the partitioning in response to the first touch. The graphic object 630 is called a "handler."

Then, the controller 180 controls the first and second regions 610 and 620 in response to the touch input with respect to the graphic object. The controller 180 moves the graphic object 630 in response to the touch with respect to the graphic object 630. For example, if the drag touch that starts from one point on the graphic object 630, as illustrated in FIG. 6B(a), is sensed, the controller 180 moves the graphic object 630 in response to the sensed drag touch.

Figure 6B:
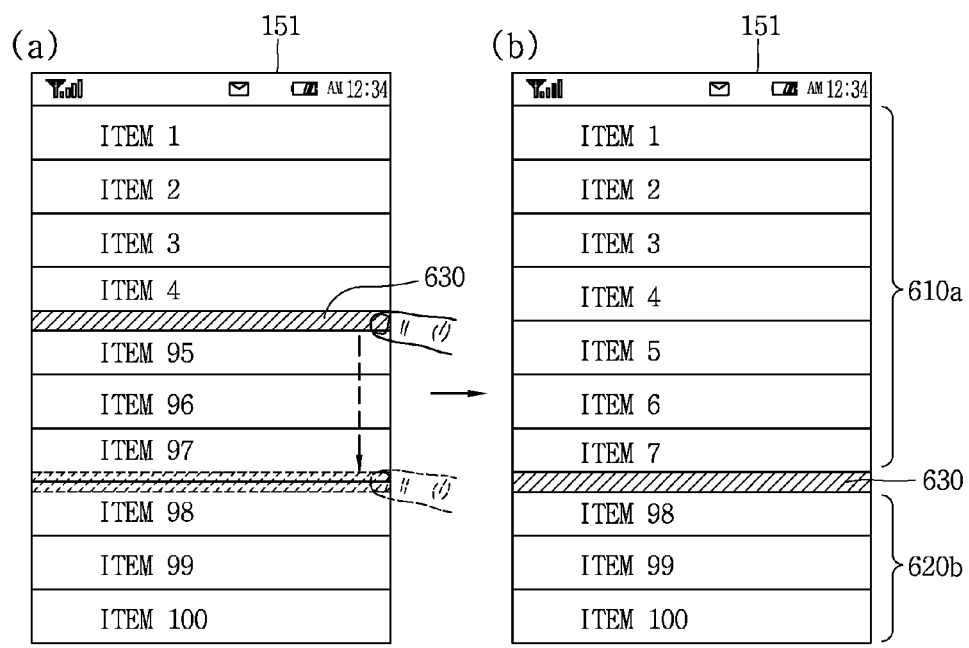

In this instance, the controller 180, as illustrated in FIG. 6B(b), changes the sizes of the first and second regions 610 and 620 depending on the movement of the graphic object 630. That is, as the graphic object 630 is moved, the first region 610 including the items 1, 2, 3, and 4 as illustrated in FIG. 6A(b) are changed into the first regions 610*a* including the items 1, 2, 3, 4, 5, 6, and 7 as illustrated in FIG. 6B(b) in terms of size.

That is, the controller 180 recognizes the movement of the graphic object 630 as the control command for adjusting the sizes of the first and second regions. Accordingly, the user can easily change the first and second regions only by moving the graphic object 630.

Figure 6C:
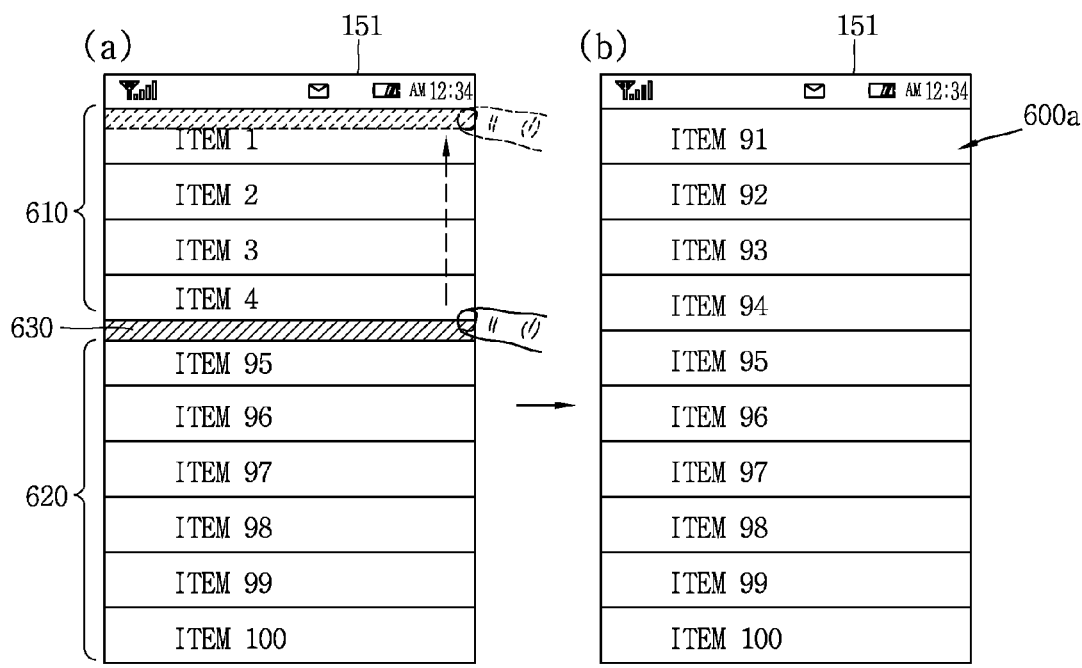

In addition, in response to the movement of the graphic object 630 to a predetermined region (for example, the upper portion of the display unit 151) on the display unit 151 as illustrated in FIG. 6C(a), the controller 180, as illustrated in FIG. 6C(b), ends the partitioning of the display unit 151 into the first and second regions 610 and 620 and outputs the items related to the items that are output to any one of the first and second regions 610 and 620. If the partitioning into the regions, as illustrated in FIG. 6C(b), is canceled, the items sequentially arranged are output to the display unit 151.

In addition, if the partitioning into the regions is canceled, the items included in any one of the first and second regions 610 and 620 are output as they are. For example, as illustrated in FIGS. 6C(a) and 6C(b), if the graphic object 630 is moved toward the first region 610, that is, toward the upper portion of the display unit 151, the items 95, 96, 97, 98, 99, and 100 that have been output to the second region 620, as they are, are output to the display unit 151, and the items 91, 92, 93, and 94 related to the items that have been output to the second region 620 are output to the display unit 151. Here, the "related items" are the items that correspond to the order in which the items are arranged in the list.

Figure 6D:
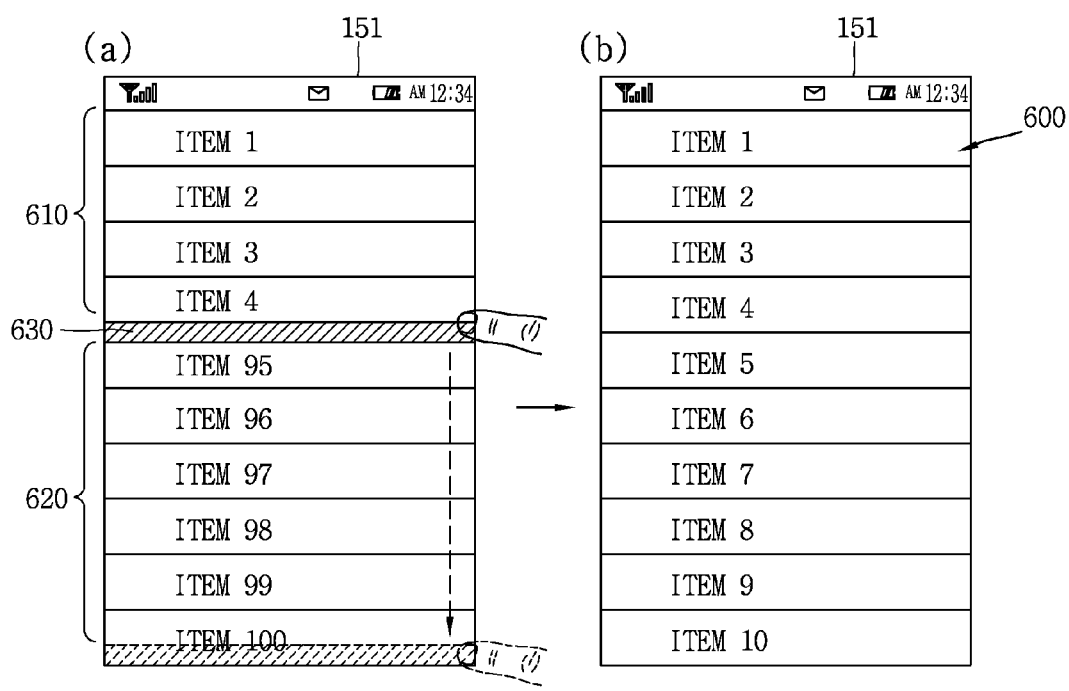

Then, as illustrated in FIGS. 6D(a) and 6D(b), if the graphic object 630 is moved toward the second region 620, that is, toward the lower portion of the display unit 151, the items 1, 2, 3, and 4 that have been output to the first region 610, as they are, are output to the display unit 151, and the items 5, 6, 7, 8, and 9 related to the items that have been output to the first region 610 are output to the display unit 151. Further, the controller 180 determines which region is maintained as it is, depending on the direction in which the graphic object is moved.

In addition, the graphic object may take on various visual appearances. For example, the graphic object takes on the visual appearance such as a zipper. In this instance, when the graphic object is generated, visual effects such as if a zipper would perform fastening or unfastening operation appears on the display unit 151. In addition, conversely, when the displaying of the graphic object is ended, the visual effects in which the zipper performs unfastening or fastening operation appears on the display unit 151.

The method of moving the items included in the regions that result from the partitioning, based on the touch with respect to the display unit is described in detail below, referring to the accompanying drawings. In particular, FIGS. 7A and 7B, FIGS. 8A-8C, FIGS. and 9A and 9B are diagrams illustrating the method of moving the items in the mobile terminal according to one embodiment of the present invention.

As described above in FIG. 3, and FIGS. 4B(a) and 4B(b), when the display unit 151 is partitioned into the first and second regions, the items displayed on the first and second regions are moved together in response to the sensing of the second touch, different from the first touch, with respect to the display unit 151.

Figure 7A:
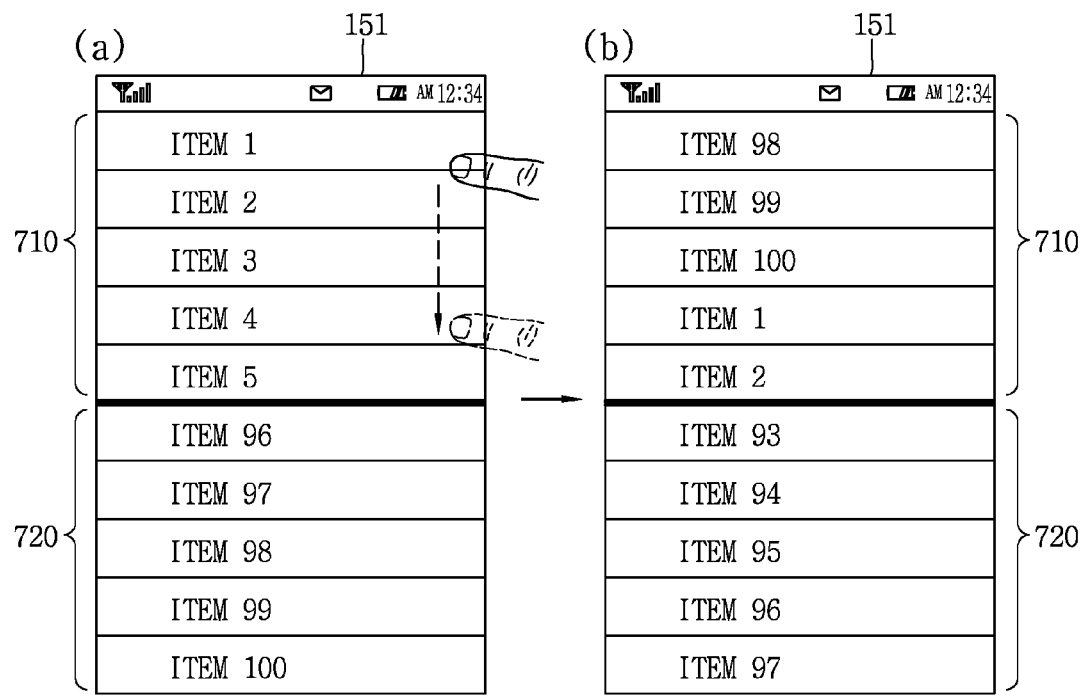
FIGS. 7A and 7B, FIGS. 8A-8C, and FIGS. 9A and 9B are diagrams illustrating a method of moving items in the mobile terminal according to one embodiment of the present invention.

For example, if the predetermined-type touch (for example, the drag touch applied corresponding to the direction (for example, the longitudinal direction) in which the items are arranged), as illustrated in FIG. 7A(a), is applied with respect to a first region 710, the controller 180, as illustrated in FIG. 7A(b), replaces at least one of the items displayed on the first region 710 with the different one, and replaces at least one of the items displayed on a second region 720 with the different one.

Based on the second touch, the controller 180 replaces at least one (for example, the items 3, 4, and 5) of the items included in the first region 710 with the different one (the item 98, 99, and 100) included in the first region 710, and replaces at least one (for example, the items 98, 99, and 100) of the items included in the second region 720 with the different one (the item 93, 94, and 95) included in the second region 720. In addition, the different item as the replacement in each of the first and second regions 710 and 720 is determined depending on the touch direction that corresponds to the second touch.

As illustrated, the controller 180 makes the items included in the first and second regions 710 and 720 move around in a circle within a scope of the list. For example, if the item included in the first region 710 is the item in the first position (for example, the item 1) in the list, the item in the last position (for example, the item 100) in the list is output in succession to the item in the first position (for example, the item 1), in response to the second touch.

Figure 7B:
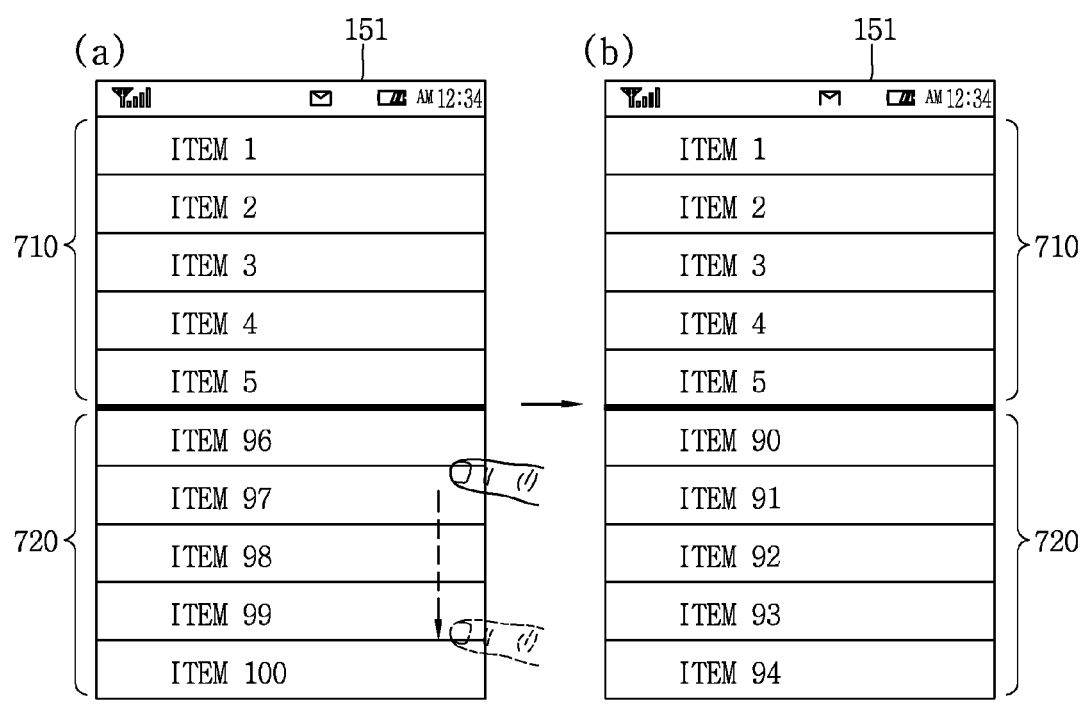

Further, in response to the touch applied to the display unit 151, the controller 180, as described above, does not move together the items included in the first and second regions 710 and 720 and moves only the items included in the region, the touch to which is sensed. For example, if the touch, as illustrated in FIG. 7B(a), is applied with respect to the second region 720, the controller 180, as illustrated in FIG. 7B(b), maintains the items included in the first region 710, as they are, and replaces at least one of the items included in the second region 720 with the different one.

Figure 8A:
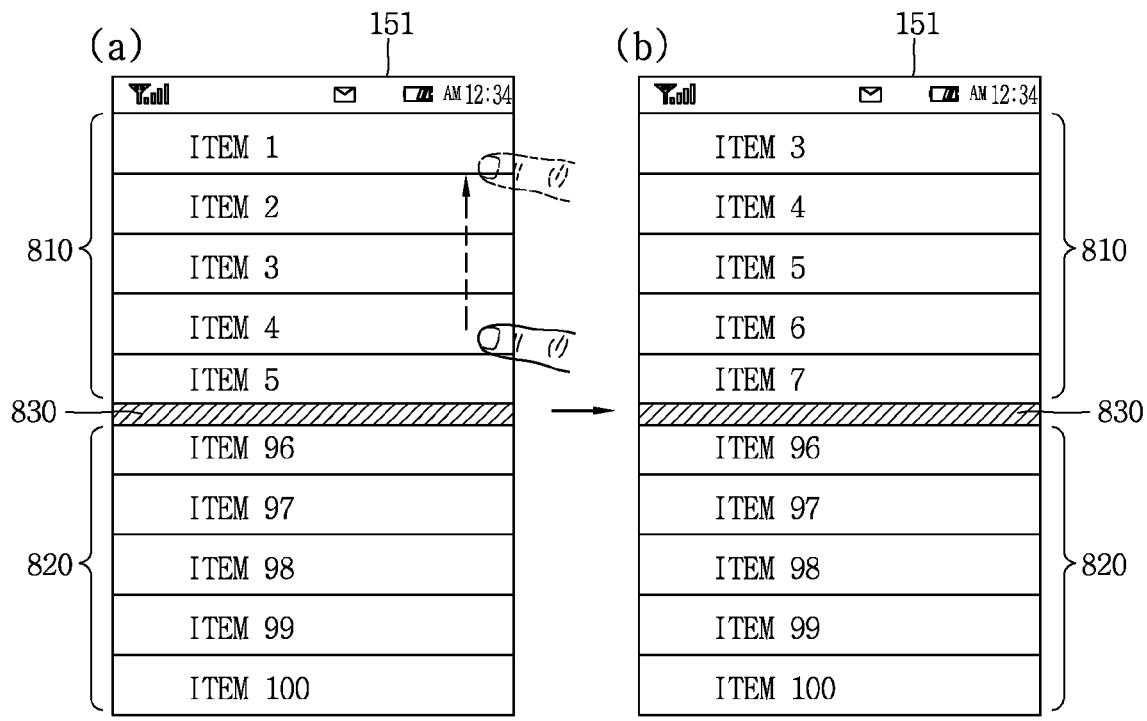

As described above, the controller 180 can move together the items displayed on first and second region 810 and 820, when a graphic object 830 (refer to 8A(a)) discriminating each region is output. Then, as another example, the controller 180, as illustrated in FIGS. 8A(a) and 8A(b), does not move together the items included in first and second regions 810 and 820 and moves only the items included in the region, the touch to which is sensed. For example, if the touch is applied with respect to the first region 810, only the items included in the first region are moved. In this instance, in the mobile terminal according to one embodiment of the present invention, a graphic object 830 is used for moving together the items included in the first and second regions 810 and 820.

Figure 8B:
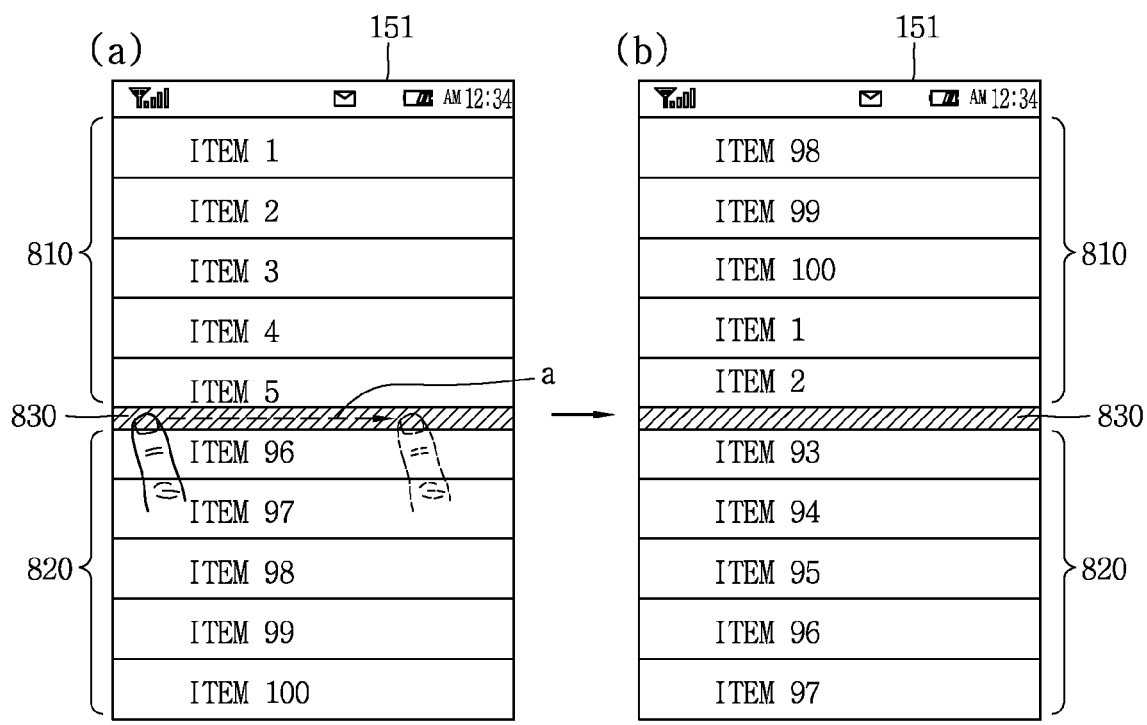

For example, if the predetermined-type touch, as illustrated in FIGS. 8B(a) and 8BB, is applied with respect to the graphic object 830, the controller 180 moves the items included in the first and second regions 810 and 820. Here, the predetermined-type touch may be the drag touch input that is applied in a given direction with respect to the graphic object 830.

Also, the given direction in which the drag touch input is applied may be different from the direction in which the drag touch input is applied for moving the graphic object described referring to FIGS. 6B-6D.

For example, the touch input for moving the graphic object may correspond to the longitudinal direction and the touch input for moving the item may correspond to the width direction.

Figure 8C:
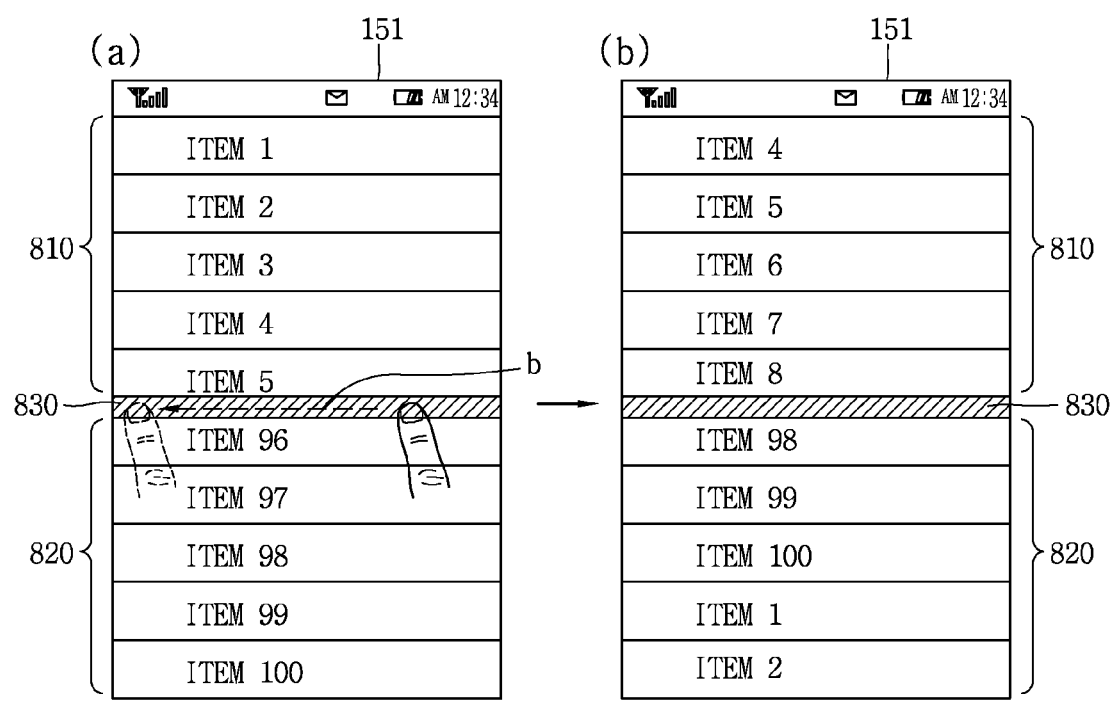

In addition, the controller 180, as illustrated in FIGS. 8B(a) and 8B(b) and FIGS. 8C(a) and 8C(b), controls display unit 151 so the direction in which the items included in the first and second regions 810 and 820 are moved varies depending on the direction of the drag touch input (for example, an 'a' direction or a 'b' direction)

Figure 9A:
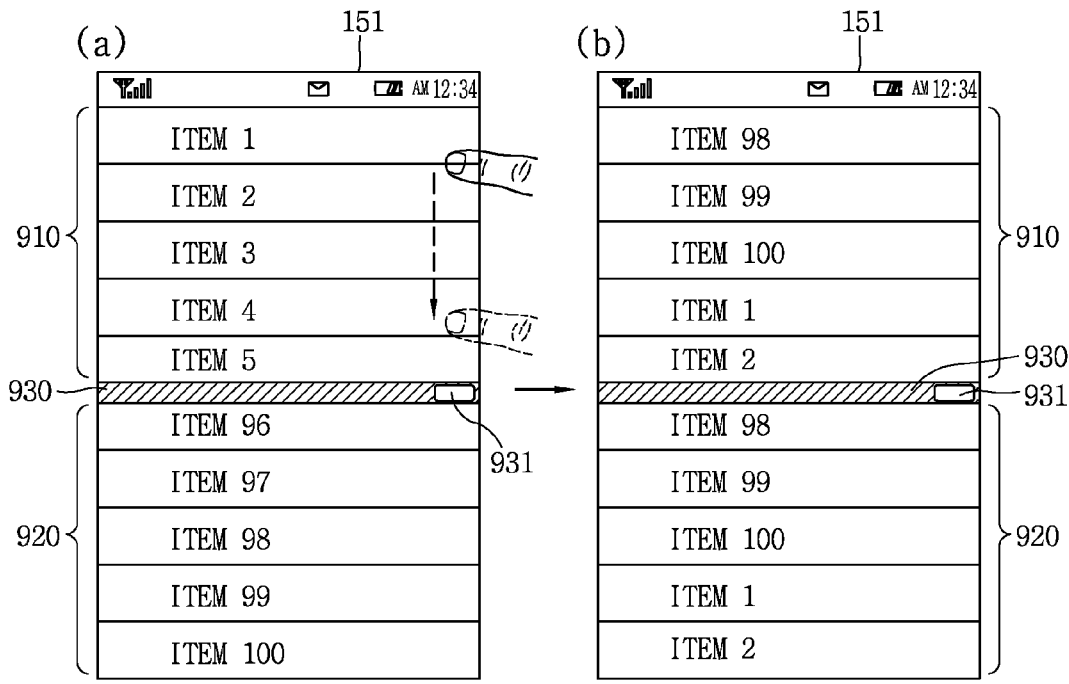

As another example, in the mobile terminal according to one embodiment of the present invention, a separate icon 931 (or a control icon 931), as illustrated in FIG. 9A(a), is provided on the graphic object 930. That is, the icon 931 is used to control the items displayed on first and second regions 910 and 920.

For example, a position of the icon 931 is changed corresponding to the touch with respect to the icon 931. The controller 180 determines whether the items included in the first and second regions 910 and 920 are moved together or only the items included in any one of the first and second regions 910 and 920 are moved, depending on where the icon 931 is positioned.

For example, if the icon 931, as illustrated in FIG. 9A(a), is positioned in neutral, that is, in the middle of the graphic object 930, the controller 180, as illustrated in FIG. 9A(b), moves together the items included in the first and second regions 910 and 920, in response to the predetermined-type touch input with respect to any one of the first and second regions 910 and 920. Then, as illustrated in FIGS. 9B(a) and 9B(b), if the icon 931 is positioned toward the first region 910, the items included in the first region 910 are not moved, and only the items included in the second region 920 are moved, in response to the predetermined-type touch with respect to any one of the first region 910 and the second region 920.

In addition, if the icon 931 is positioned toward the second region 920, the controller 180 does not move the items included in the second region 920 and moves only the items included in the first region 910, in response to the predetermined-type touch with respect to any one of the first region 910 and the second region 920.

Figure 9B:
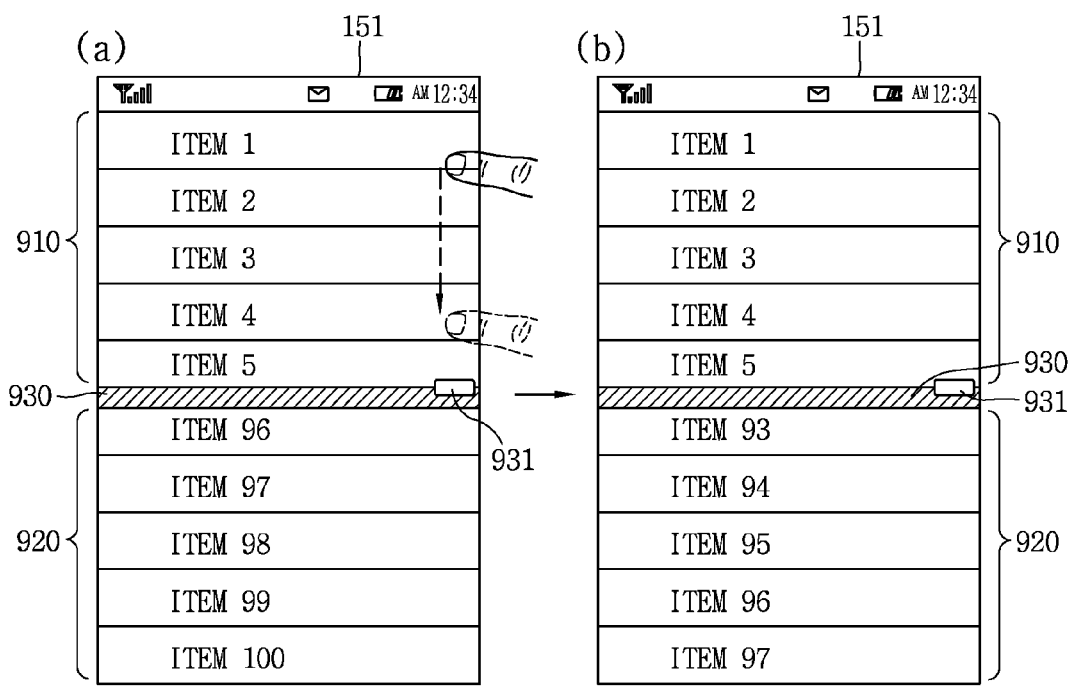

Further, according to an embodiment of the present invention, the moving of the items included in any one of the regions is controlled through the use of various modifications in addition to the method in which the changing of the position of the icon prevents the items included in any one of the regions from being moved, as illustrated in FIGS. 9A and 9B.

Figure 10:
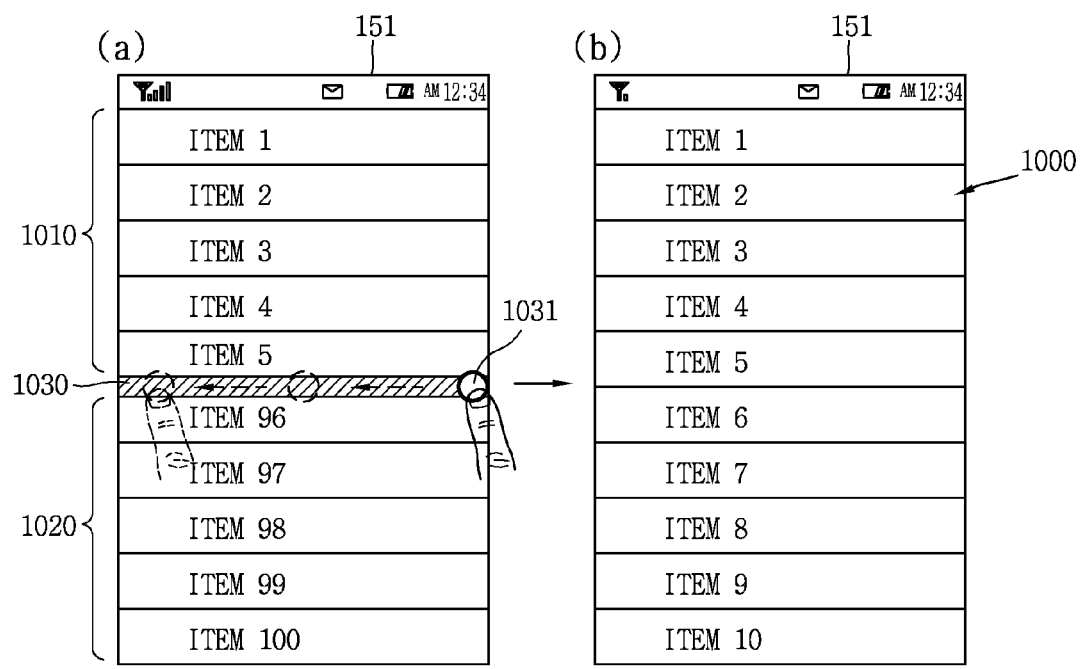
FIGS. 10A and 10B, and FIGS. 11A-11C are diagrams illustrating a method of making efficient use of the graphic object in the mobile terminal according to one embodiment of the present invention.

A method of making efficient of the graphic object is described in detail below, referring to the accompanying drawings. In particular, FIGS. 10 and 11 are diagrams illustrating a method of making efficient use of the graphic object in the mobile terminal according to one embodiment of the present invention.

In the mobile terminal according to one embodiment of the present invention, the list is partitioned into the multiple regions and is output, based on the provision of a function icon 1031 on a graphic object 1030 discriminating between first and second regions 1010 and 1020 and the selection of the function icon 1031 in a predetermined manner as illustrated in FIGS. 10(a) and 10(b). Here, the example in which the function icon 1031 is selected "in the predetermined manner," includes moving the function icon 1031 in a predetermined direction. In addition, the example in which the function icon 1031 is selected "in the predetermined manner," includes touching the function icon 1031 for a predetermined time.

Further, the function icon 1031 is also used in performing the function of the icon 931 described referring to FIGS. 9A and 9B. In addition, the mobile terminal according to one embodiment of the present invention provides various functions related to the list, such as a search function and an alignment function that make efficient use of the graphic object.

Figure 11A:
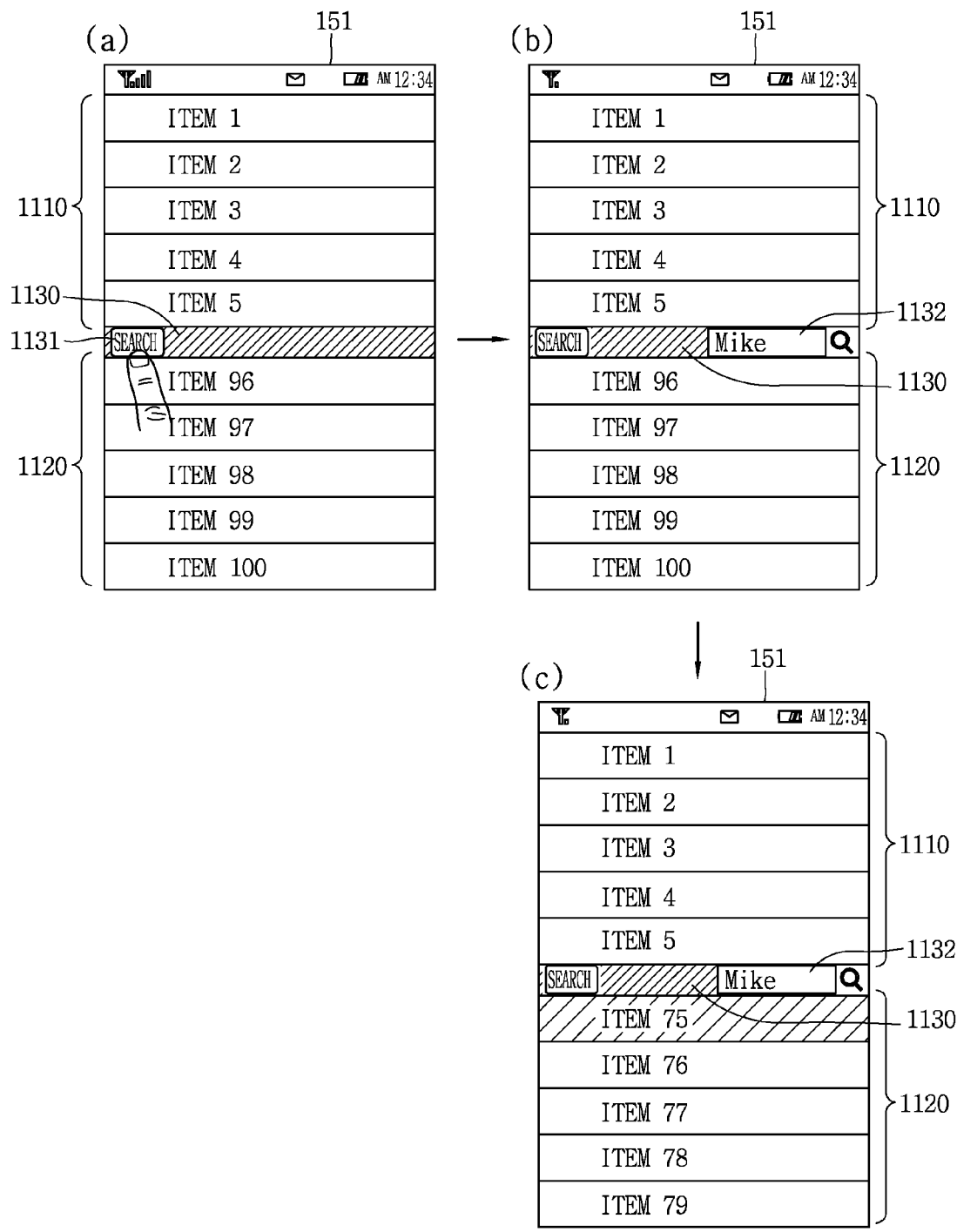

As one example, as illustrated in FIG. 11A(a), a function icon 1131 for performing the search function is provided on the graphic object 1130. As illustrated in FIGS. 11A(b) and 11A(c), if the function icon 1131 is selected, the controller 180 additionally outputs a search window 1132 for receiving an input of a search word. If the search word is input to the search window 1132, the controller 180, as illustrated in FIG. 11A(c), searches for the search word, "mike" and the item "75" related to the search word and outputs these to any one of multiple regions 1110 and 1120. The search window 1132 may be provided on a graphic object 1130.

Figure 11B:
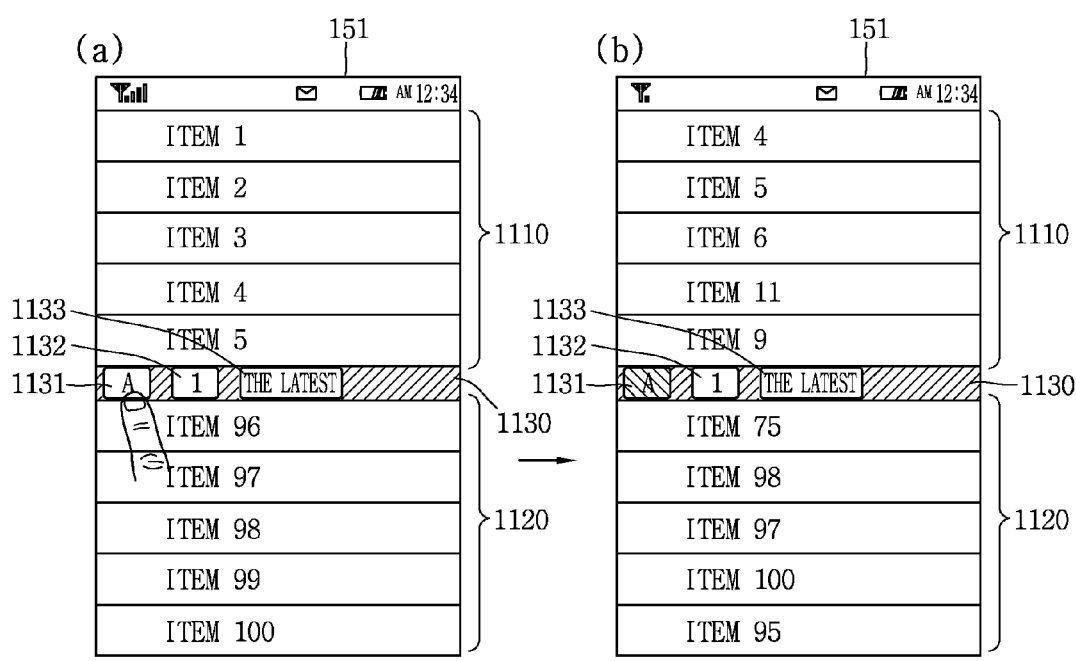

As another example, as illustrated in FIG. 11B(a), the alignment function icons 1131, 1132, and 1133 for aligning the items displayed on the multiple regions 1110 and 1120 are output to the graphic object 1130. For example, the icons that align the items in alphabetical (or Korean alphabetical) order, in arrangement order (for example, in ascending order and in descending order), and in latest occurrence order are output to the graphic object 1130. For example, if the icon 1131 for aligning the items in alphabetical order, as illustrated in FIG. 11B(a), is selected, the controller 180, as illustrated in FIG. 11B(b), aligns the items in alphabetical order.

In addition, the controller 180 causes the list, which is to be displayed on at least one of the multiple regions, to be selected through the use of the function icon provided on the graphic object. That is, if the list is selected through the use of the function icon provided on the graphic object, the controller 180 changes the list displayed on at least one of the multiple regions. For example, when the list corresponding to "bookmarked contact information" is displayed on all of the first and second regions, if the list corresponding to a "frequent call list" is selected through the use of the graphic object, the controller 180 outputs the list corresponding to the "frequent call list" to at least one of the first and second regions, instead of the "bookmarked contact information.

Figure 11C:
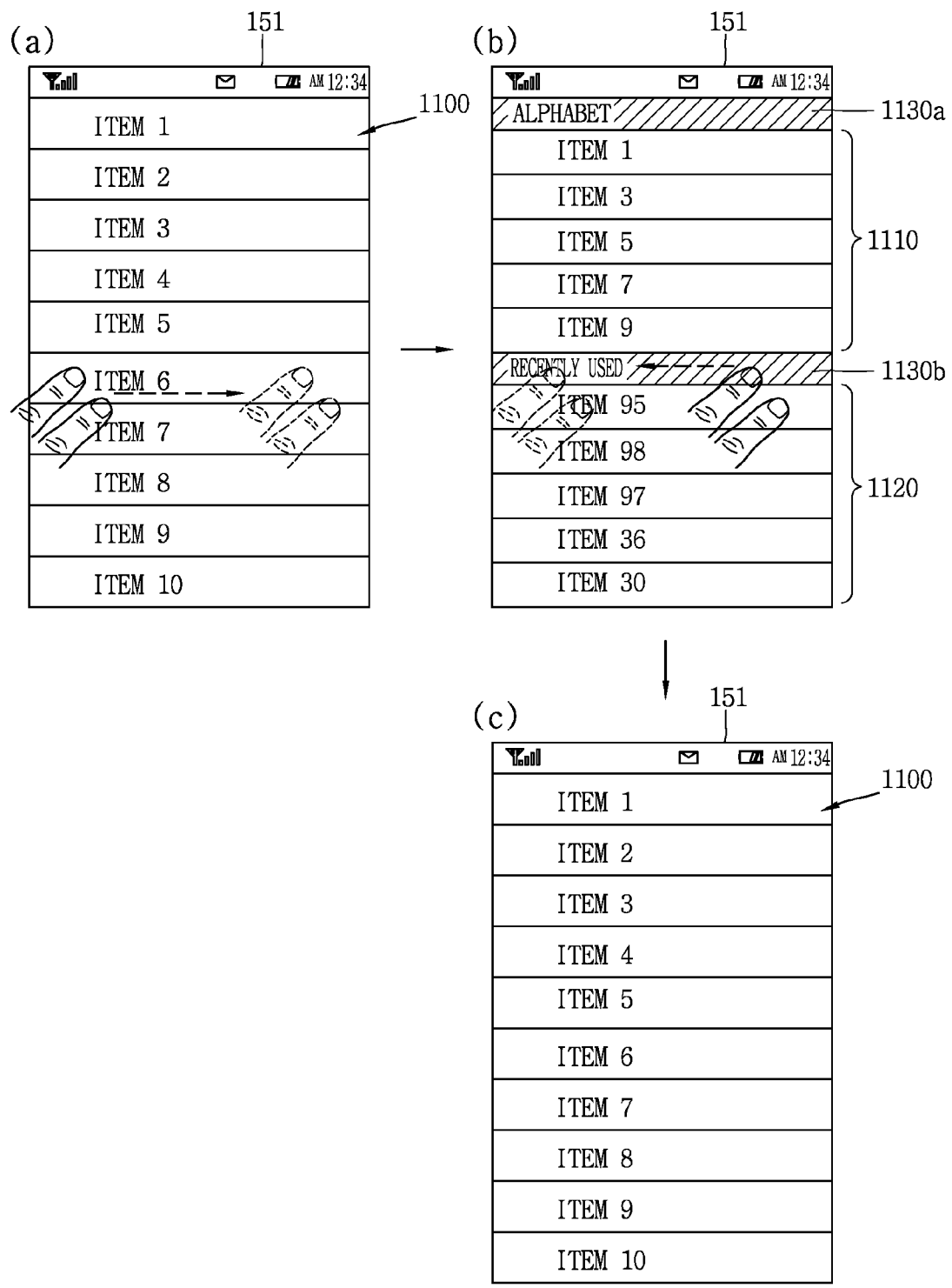

As described above, if the touch, as illustrated in FIG. 11C(a), is applied with respect to at least two points on the display unit, that is, if a multi touch is applied, the controller 180 partitions the display unit into the multiple regions 1110 and 1120, in response to this. In this instance, the controller 180, as illustrated in FIG. 11C(b), aligns the items included in the list on the different bases and outputs the lists, in each of which the items are aligned on the different basis, to the first and second regions 1110 and 1120, respectively. For example, the items that are aligned in alphabetical order are output to the first region 1110 and the items that are aligned in order of recently-used items are output to the second region 1120.

In this instance, graphic objects 1130a and 1130b are output to the multiple regions 1110 and 1120, respectively. Thus, the user can change a basis for aligning the items output to each region through the use of the graphic objects 1130a and 1130b. That is, the mobile terminal according to the embodiment of the present invention can provide a user environment, or a graphical user interface (GUI) in which the alignment basis is changed through the selection of the graphic objects 1130a and 1130b.

Further, if the multi touch, as illustrated in FIG. 11C(b), is again applied in the direction opposite to the direction in which the multi touch for partitioning the display unit 151 into the multiple regions have been applied, the controller 180 cancels the partitioning of the display unit 151 into the multiple regions.

As described above, the mobile terminal and the method of controlling the mobile terminal according to one embodiment of the present invention can improve the user's convenience by controlling the items output to the display unit more variously through the use of the graphic object.

Figure 12:
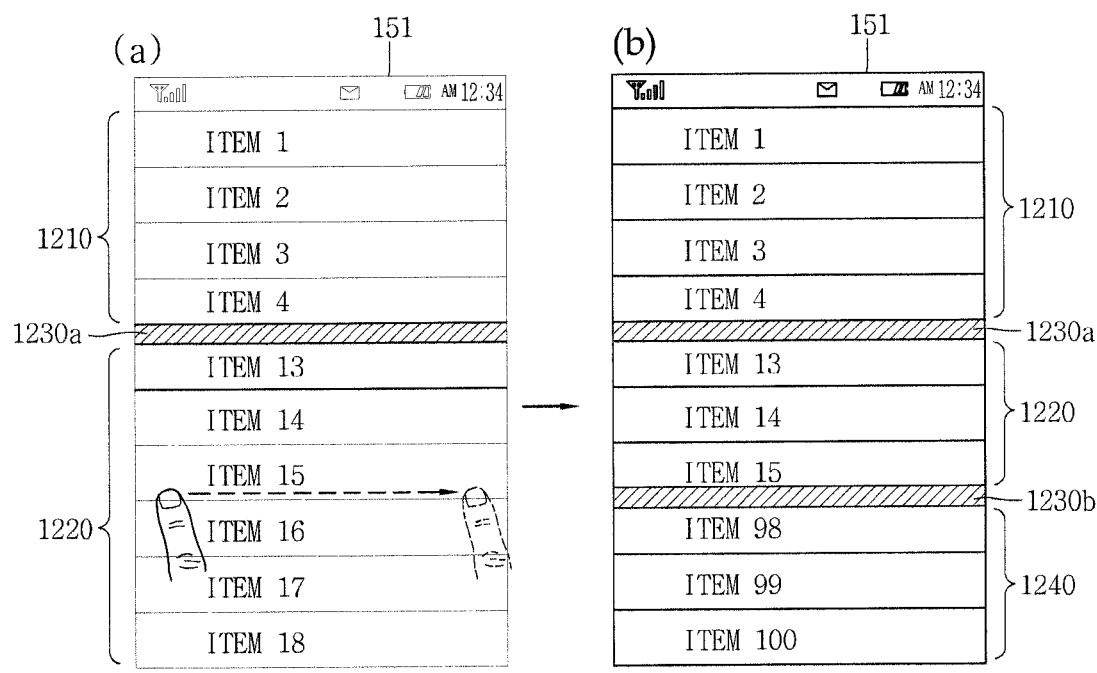
FIGS. 12A and 12B and FIGS. 13A and 13B are diagrams illustrating the method to additionally partition the region in the mobile terminal according to one embodiment of the present invention.

A method of additionally partitioning (or dividing) the regions that results from the partitioning (the division) is described in detail below, referring to the accompanying drawings. FIGS. 12 and 13 are diagrams illustrating the method to additionally partitioning the region in the mobile terminal according to one embodiment of the present invention;

When the display unit 151 is partitioned into the first and second regions 1210 and 1220 as illustrated in FIG. 12(a), if the first touch corresponding to the predetermined-type is again applied, the controller 180, as illustrated in FIG. 12(b), additionally partitions the display region of the display unit 151 based on the region (between the item 15 and the item 16) to which the first touch is applied. That is, the display unit 151, as illustrated in FIG. 12(b), is partitioned into the first and second regions 1210 and 1220 and a third region 1240.

Further, an additional graphic object 1230b is output between the second and third regions 1220 and 1240. The embodiments described above are also applied to when the display unit is partitioned into the three regions in this manner, and therefore a detailed description of the instance is omitted.

Figure 13A:
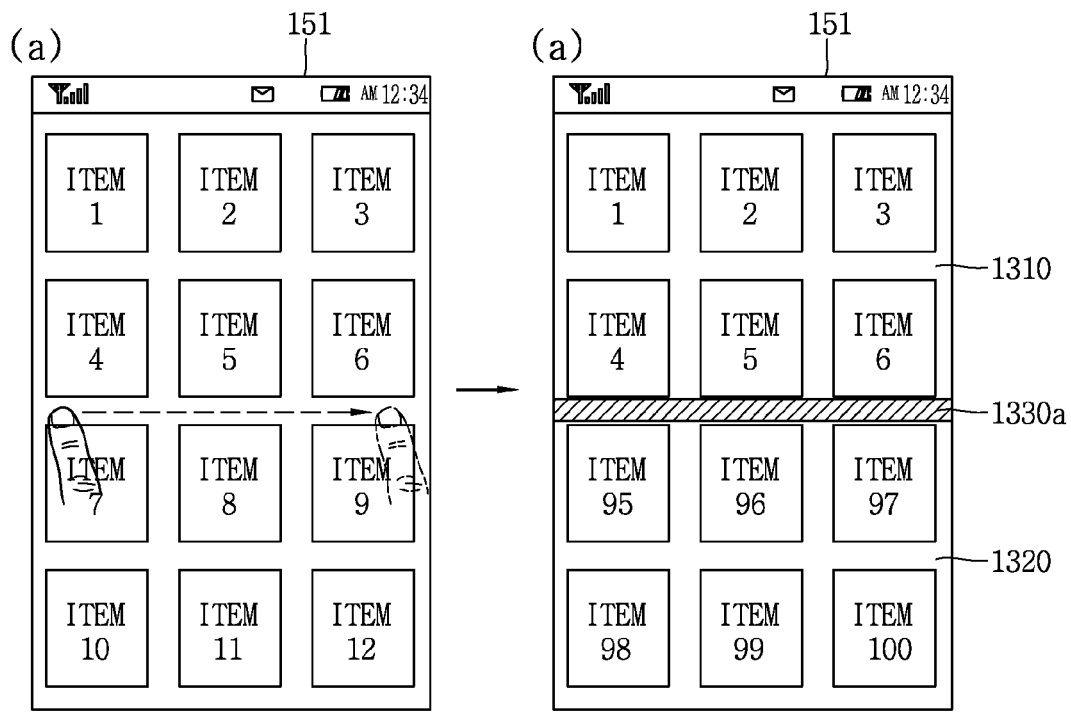

In addition, only the list in which the items are sequentially arranged in the longitudinal direction is described above, but the items included in the list may be variously arranged in a regular manner. For example, as illustrated in FIG. 13A(a), the items may be sequentially arranged in the longitudinal direction, with the three items being arranged in the width direction. In this instance, if the predetermined-type first touch is applied with respect to the display unit 151, the controller 180, as illustrated in FIG. 13A(b), also partitions the display unit 151 into first and second regions 1310 and 1320, on the basis of a point to which the first touch is applied.

Figure 13B:
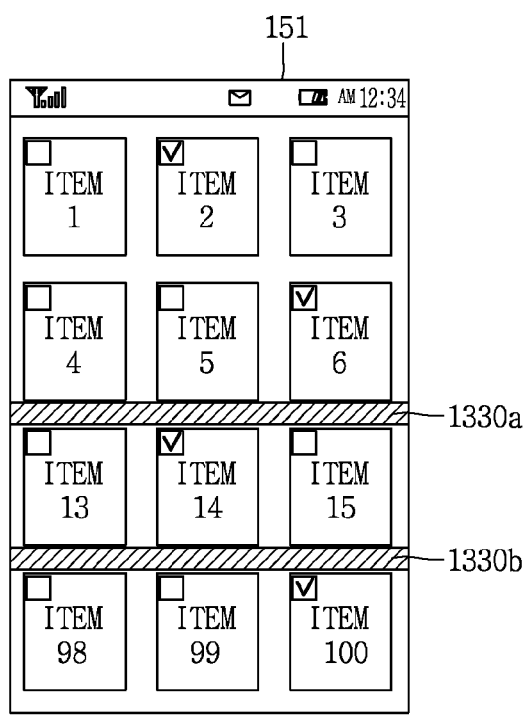

In addition, the controller 180, as illustrated in FIG. 13B, partitions the display unit 151 into the first and second 1310 and 1320 and a third region 1330, on the basis of a user's selection. If the display unit 151 is partitioned into the multiple regions in this manner, even though the items to be selected are not arranged adjacent to each other, the user can conveniently select the items through the multiple regions.

Specific embodiments in the mobile terminal according to one embodiment of the present invention, to which the embodiments described above are applied are described below, referring to the accompanying drawings. In particular, FIGS. 14-18 are diagrams illustrating the specific embodiment in the mobile terminal according to one embodiment of the present invention.

Figure 14A:
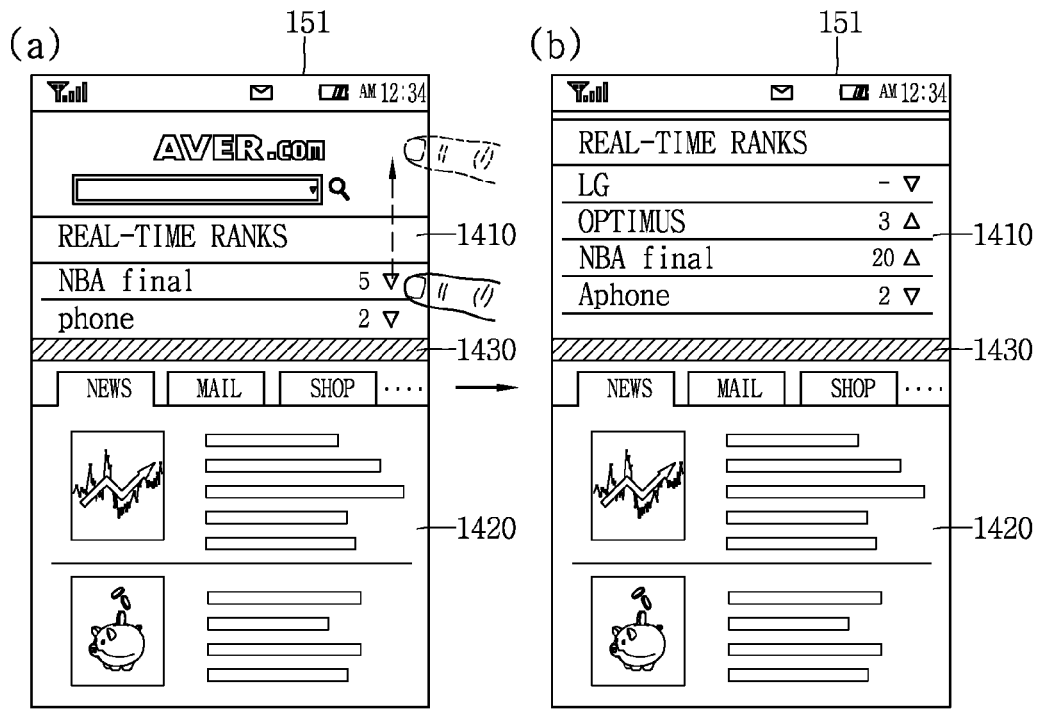

As one example, as illustrated in FIGS. 14A(a) and 14A(b), when a screen corresponding to a web browser is output, the mobile terminal according to one embodiment of the present invention partitions the screen display region of the display unit 151 into first and second regions 1410 and 1420, and outputs a graphic object 1430 for discriminating between the first and second regions 1410 and 1420. Then, if the drag touch input is applied with respect to the first region 1410, as illustrated in FIG. 14A(a), the controller 180, as illustrated in FIG. 14A(b), changes the screen information displayed on the first region 1410. In this instance, the controller 180 may not change the screen information displayed on the second region 1420.

Figure 14B:
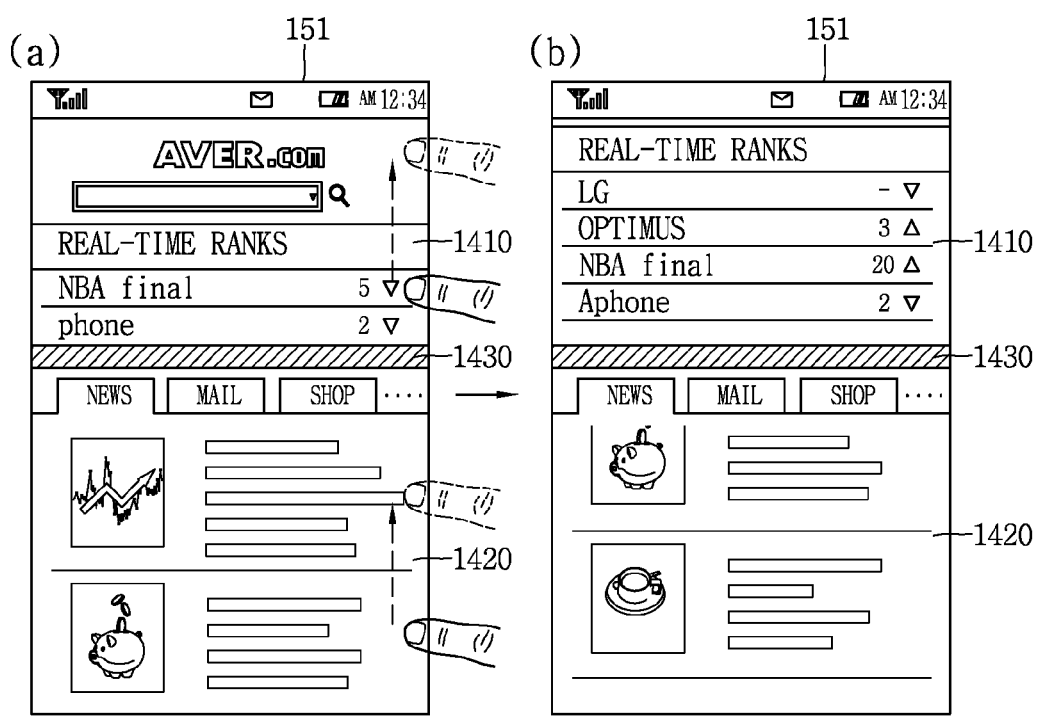
Figure 16:
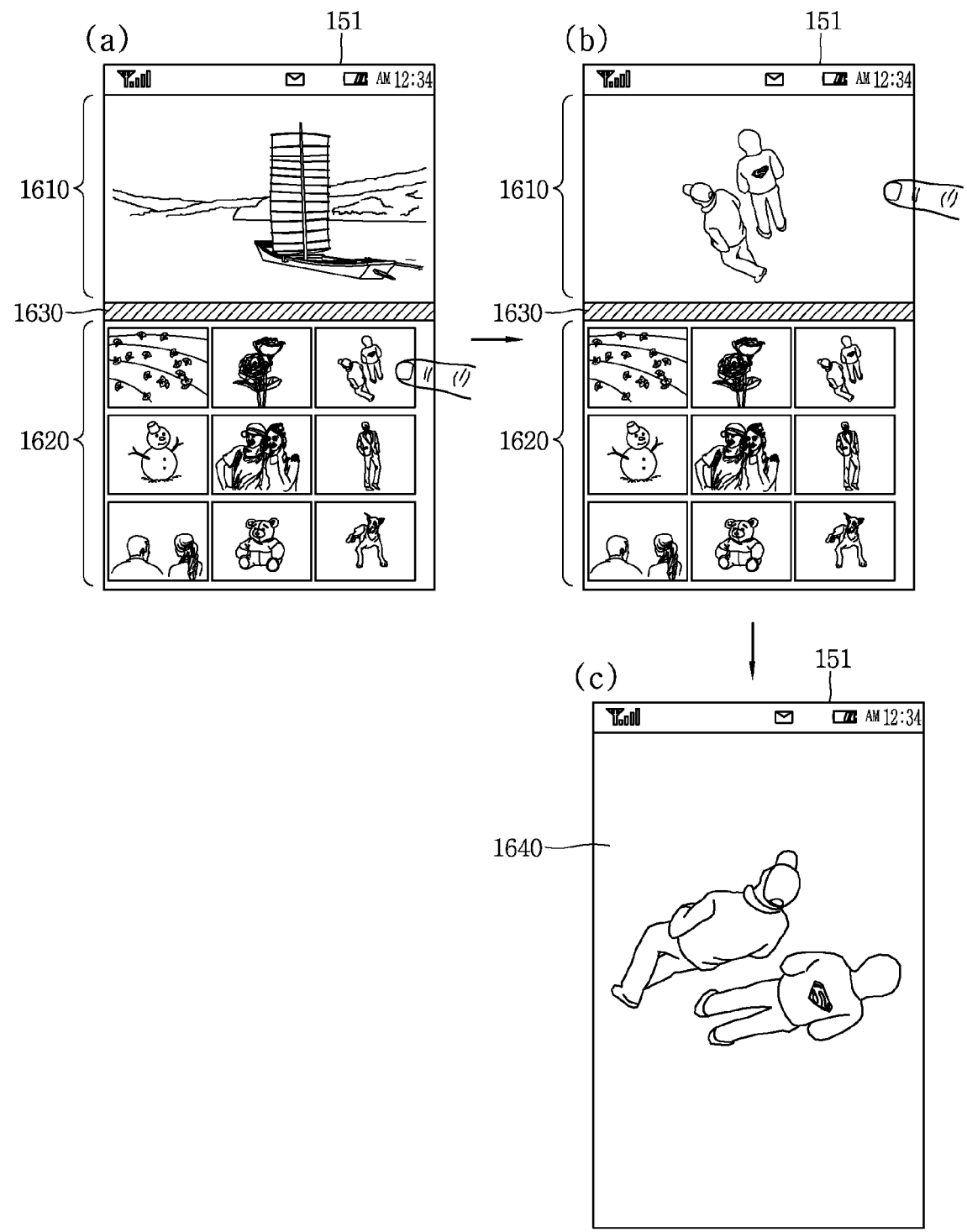
Figure 17:
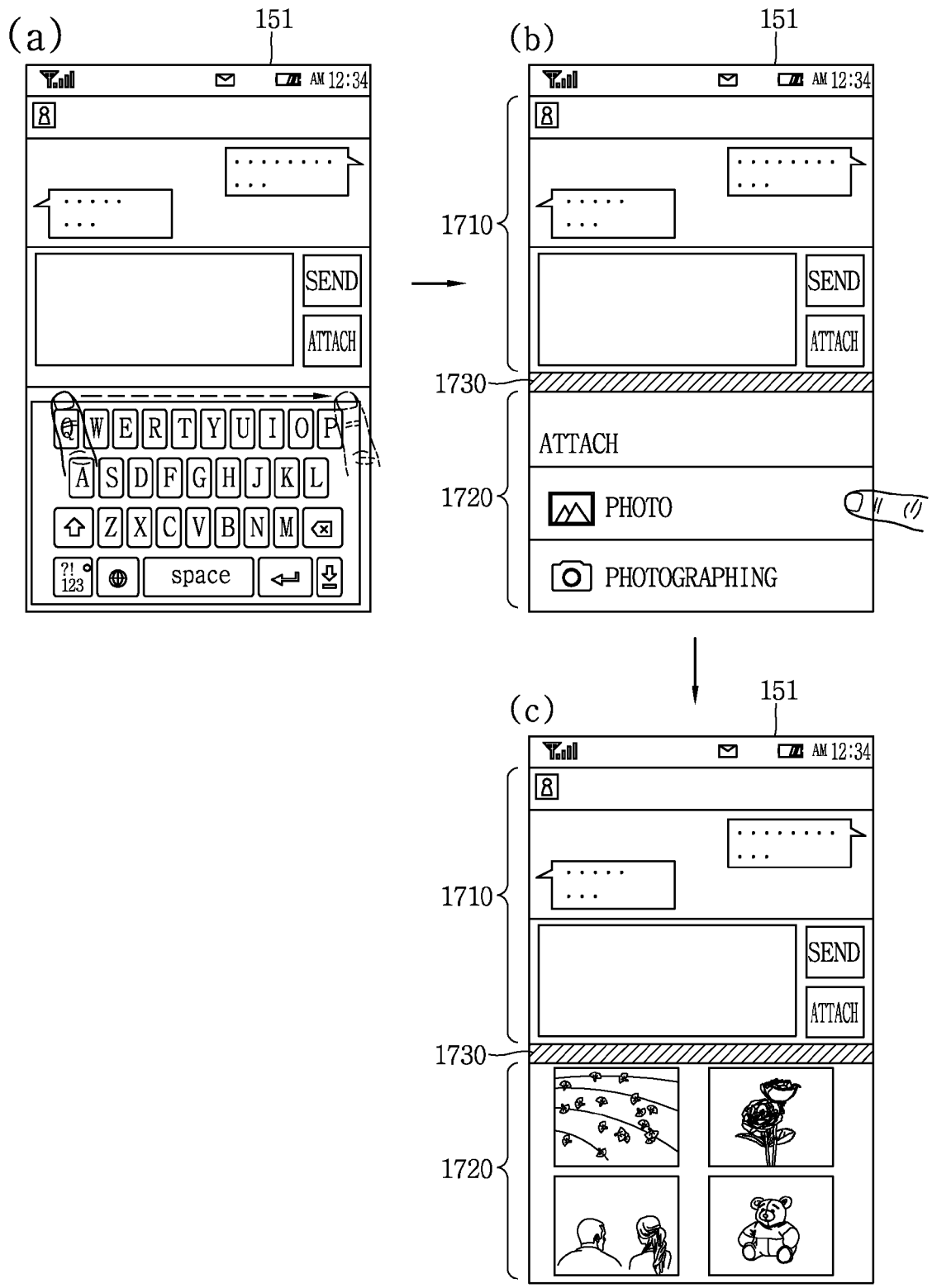
Figure 18:
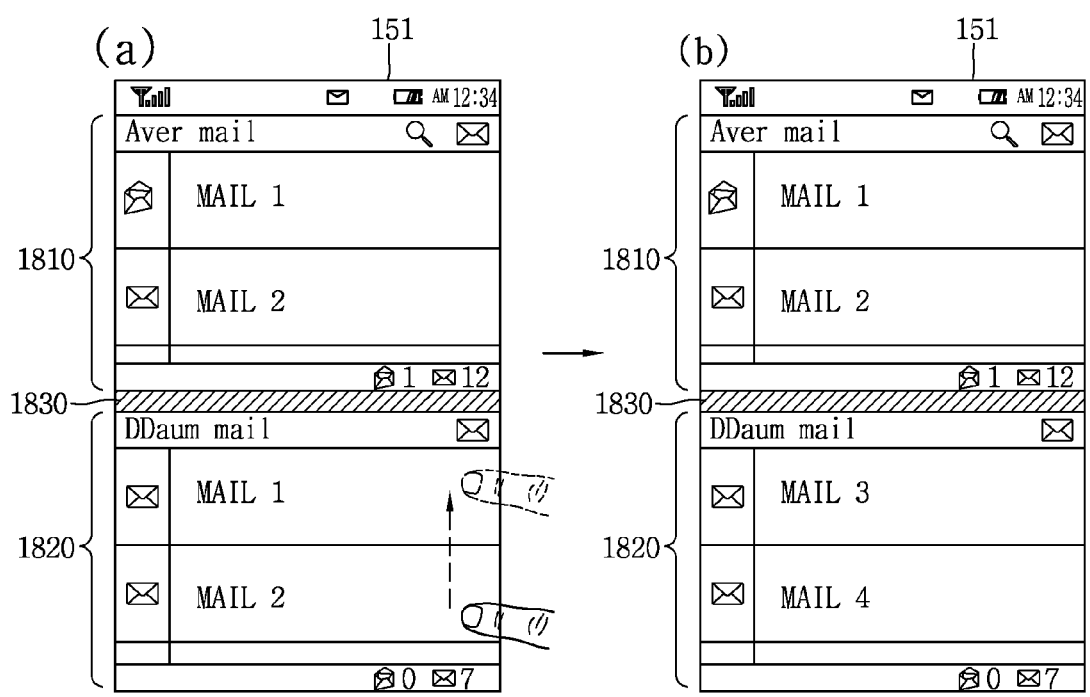

In addition, as illustrated in FIGS. 14B(a) and 14B(b), if the touch input is applied with respect to the first and second regions 1410 and 1420 at the same time, the controller 180 replaces the items of screen information displayed on the first and second regions 1410 and 1420 at the same time.

As another example, as illustrated in FIGS. 15(a) to 15(d), when a memo function application is executed, the screen display region of the display unit 151 is partitioned into first and second regions 1510 and 1520. In this instance, as illustrated in FIG. 15(a), memo information corresponding to any one of memo items selected by the user is output to the first region 1510, and a memo list is output to the second region 1520. Then, if the first region 1510, as illustrated in FIG. 15(b), is selected, the controller 180 ends the outputting of the memo list, and, as illustrated in FIG. 15(c), outputs the memo information, which corresponds to the selected memo item, as a whole to the display unit 151.

Then, if the request to return back to the previous step is received from the user, the controller 180, as illustrated in FIG. 15(d), partitions the screen display region of the display unit 151 into first and second regions 1510 and 1520, and outputs the memo information to the first region 1510 and outputs the memo list to the second region 1520.

As another example, when an application corresponding to a photograph album is executed as illustrated in FIG. 16(a), the controller 180 outputs a detailed image to a first region 1610 and outputs image items to a second region 1620. In addition, if any one of the image items displayed on the second region 1620, as illustrated in FIG. 16(a), is selected, the controller 180, as illustrated in FIG. 16(b), replaces the detailed image displayed on the first region 1610 with the image corresponding to the selected image.

Furthermore, if the predetermined-type touch input, as illustrated in FIG. 16(b), is applied with respect to the first region 1610, the controller 180, as illustrated in FIG. 16(c), outputs the detailed image that has been output to the first region 1610, as a whole, to the screen display region of the display unit 151. In addition, if any one of the items is selected on the second region 1620, the controller 180 maintains the state in which the detailed image is displayed on the first region, and outputs information corresponding to the selected item to the second region 1620.

As another example, if the first touch corresponding to the predetermined type is applied when a message function application is executed as illustrated in FIG. 17(a), the controller 180, as illustrated in FIG. 17(b), partitions the display unit 151 into first and second regions 1710 and 1720. Then, the screen information that has been output to the display unit 151 prior to the partitioning into the regions continues to be output to the first region 1710, as illustrated in FIG. 17(b), and the list related to the attached file is output to the second region 1720. Then, if any one of the items, as illustrated in FIG. 17(b), is selected on the second region 1720, the controller 180, as illustrated in FIG. 17(c), outputs the screen information corresponding to the selected item to the second region 1720.

As another example, as illustrated in FIGS. 18(a) and 18(b), if the display unit 151 is partitioned into first and second regions 1810 and 1820 when a mail function application is executed, the controller 180 outputs mail lists corresponding to different accounts, to the regions, respectively. As described above, in the mobile terminal according to one embodiment of the present invention, through various modifications, the method can be applied in which the display unit is partitioned into the multiple regions with respect to each of the applications having different characteristics and the lists are output to the regions that result from the partitioning.

Further, in the mobile terminal according to one embodiment of the present invention, if the touch input corresponding to the predetermined type for moving the item that is output is applied to the display unit 151, the speeds at which the item are moved are controlled in such a manner that the speeds are different from each other, based on at least one of the speed and the length of the touch input. Then, if the list is being moved fast in response to the touch input corresponding to the predetermined type, a visual effect in which the fast movement of the list is visually expressed may be provided in order to enable the user to be aware that the list is being moved fast.

Figure 19:
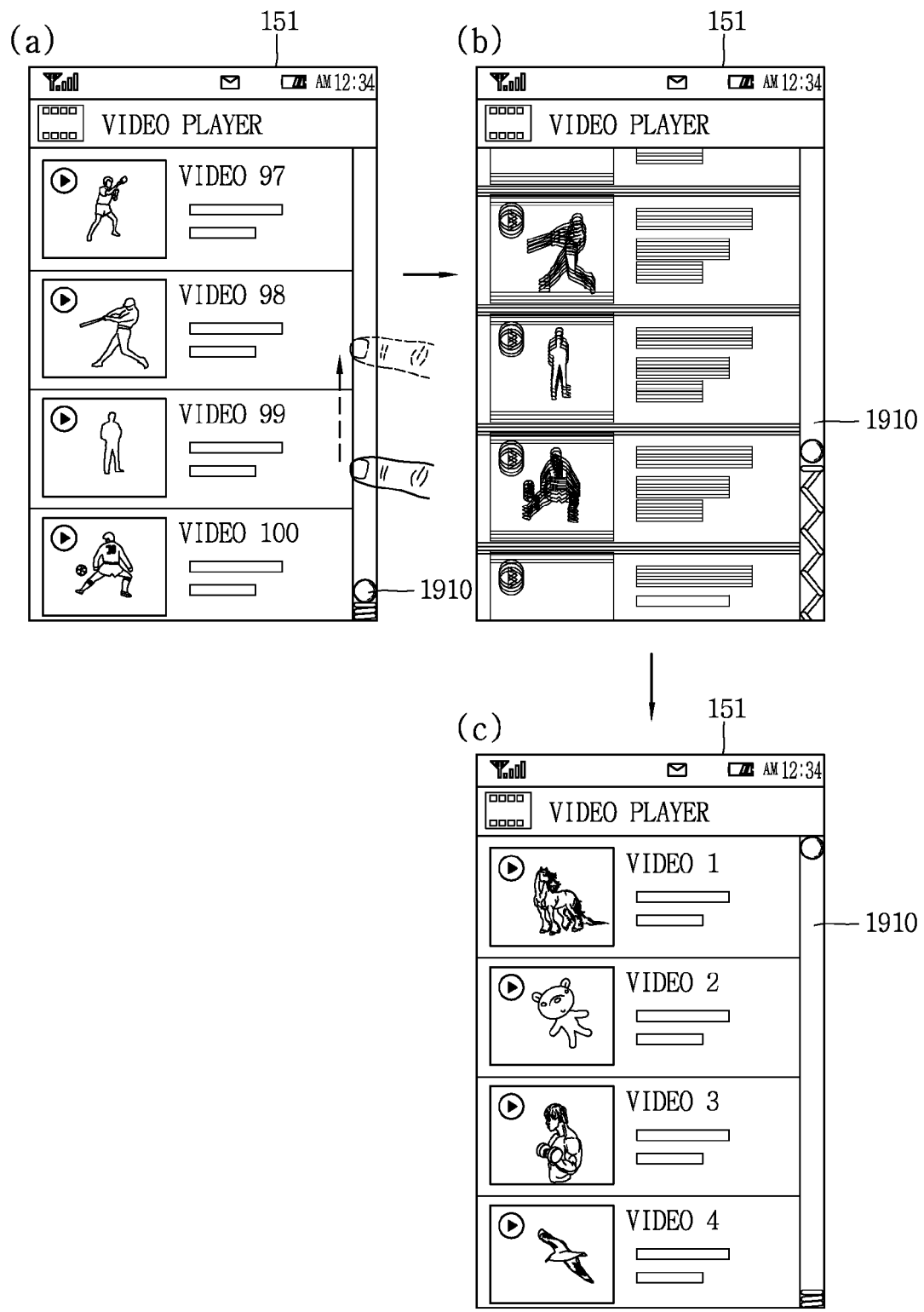
FIGS. 19A to 19C and FIGS. 20A to 20D are diagrams illustrating an animation effect that appears when the items are moved in the mobile terminal according to one embodiment of the present invention.

For example, as illustrated in FIG. 19(*a*), a coil spring image and a ball bearing image are output to a scroll bar 1910. Then, if the predetermined-type touch input for moving the items included in the list is applied with respect to the display unit 151, the controller 180, as illustrated in FIGS. 19(*b*) and 19(*c*), gradually changes the positions of the coil spring image and the ball bearing image. In this instance, the items displayed on the display unit 151 can be moved faster depending on the extent to which the touch input is applied and the items can be obscurely displayed.

Figure 20:
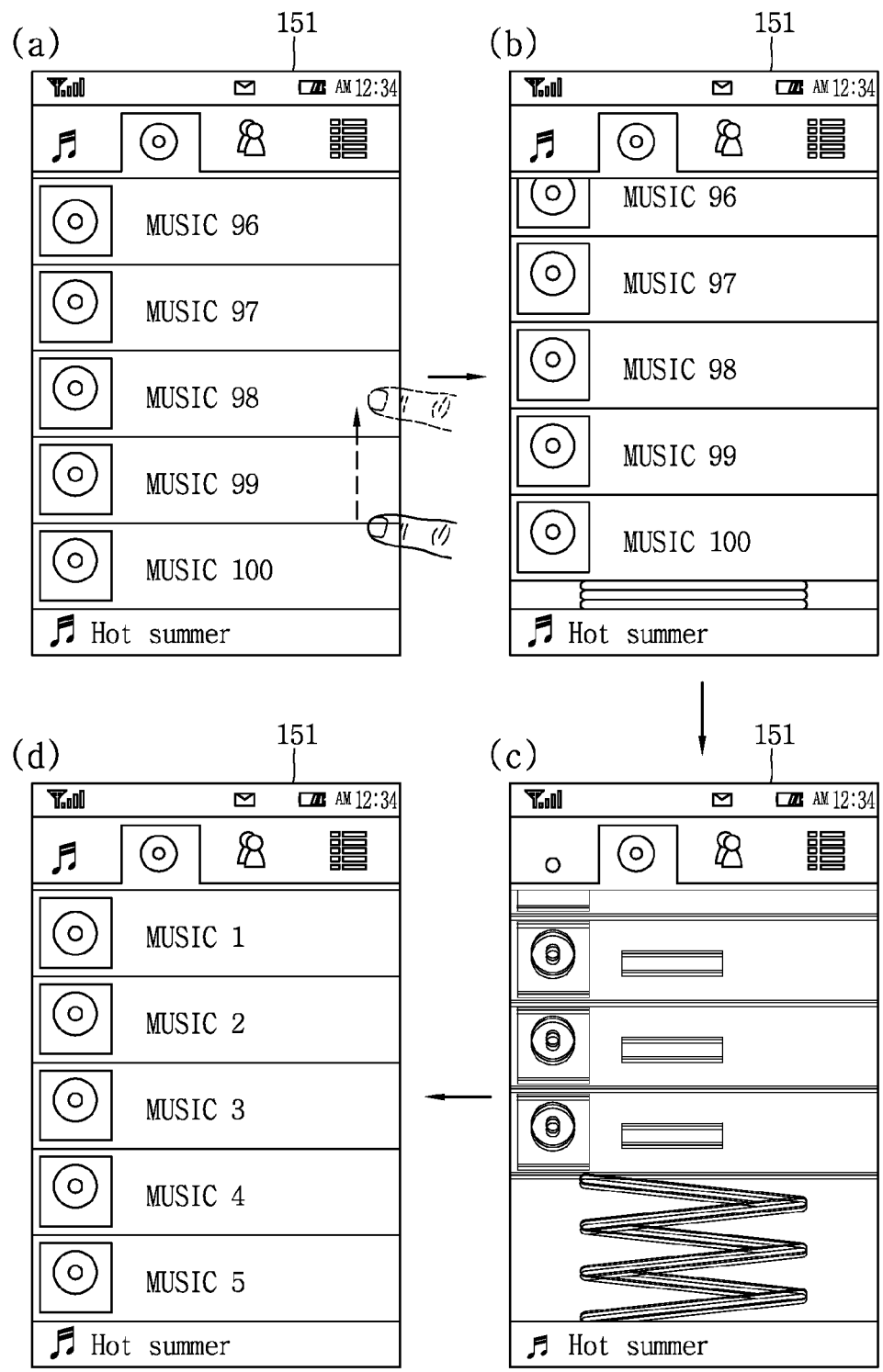

In addition, as illustrated in FIG. 20(*a*), the controller 180 outputs the spring image as another visual effect. Then, if the predetermined-type touch input for moving the items included in the list is applied with respect to the display unit 151, the controller 180, as illustrated in FIGS. 20(*b*) and 20(*c*), provides the visual effect in which the spring gradually expands. In this instance, the items displayed on the display unit 151 can be moved faster depending on the extent to which the touch input is applied and the items can be obscurely displayed.

As described above, the mobile terminal and the method of controlling the mobile terminal according to embodiments of the present invention can provide the user with visual enjoyment by displaying an animation effect depending on the speed at which the item is moved.

In addition, in the mobile terminal and the method of controlling the mobile terminal according to one embodiment of the present invention, the display unit is partitioned into the multiple regions in response to the touch input applied to the display unit when the list is output, and the items, which belong to different groups, of the items included in the list are output to each of the multiple regions that result from the partitioning. Accordingly, at a glance, the user can recognize the items, which belong to different groups, through the multiple regions.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, and all of, or some of the embodiments may be selectively combined with each other in a manner that creates various modifications.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen display; and
a controller configured to:
display, on the touch screen display, a first part of a list, wherein the first part comprises items included in the list;
sense a predetermined-type first touch input with respect to the touch screen display,
partition the touch screen display into at least first and second regions in response to the first touch input, wherein a graphic object, discriminating the first and second regions and comprising an icon for controlling the first and the second regions, is displayed to a border region between the first and second regions in response to the first touch input,
display at least some of the first part to the first region,
display a second part of the list to the second region, wherein the second part of the list comprises at least a first item or a last item in the list,
sense a predetermined-type second touch input different from the first touch input with respect to the touch screen display,
determine, in response to the second touch input, whether items included in the first and second regions are moved together or items included in one of the first and second regions are moved, depending on where the icon is positioned, and
move the items included in the first and second regions together or move the items included in the one of the first and second regions based on the determination related to the position of the icon,
wherein:
if the icon is positioned in the middle of the graphic object, the controller moves together the items included in the first and second regions, in response to the second touch input,
if the icon is positioned toward the first region, the items included in the first region are not moved and only the items included in the second region are moved, in response to the second touch input, and
if the icon is positioned toward the second region, the items included in the second region are not moved and only the items included in the first region are moved, in response to the second touch input, and wherein the position of the icon is changed by a third touch input with respect to the icon.

2. The mobile terminal according to claim 1, wherein, if the items displayed on the first region correspond to an upper portion of the list, the controller is further configured to display said at least one other item including the last item in the list to the second region, and wherein, if the items displayed on the first region correspond to a lower portion of the list, the controller is further configured to display said at least one other item including the first item in the list to the second region.

3. The mobile terminal according to claim 1, wherein, based on the second touch input, the controller is further configured to:

replace at least one of the items included in the first region with a different item allocated to the first region but not displayed in the first region, and replace at least one of the items included in the second region with a different item allocated to the second region but not displayed in the second region, and wherein an amount of the different items as replacements in the first and second regions is determined depending on a touch direction of the second touch input.

4. The mobile terminal according to claim 3, wherein the controller is further configured to scroll the items included in the first and second regions so as to move around in a circle within the list based on the second touch input.

5. The mobile terminal according to claim 1, wherein the controller is further configured to determine sizes of the first and second regions based on a position where the first touch input is sensed.

6. The mobile terminal according to claim 5, wherein the controller is further configured to:

partition the touch screen display into the first and second regions based on the position where the first touch is sensed, and determine a number of the items to be displayed on each of the first and second regions based on the sizes of the first and second regions.

7. The mobile terminal according to claim 1, wherein the first touch input is a drag touch input that starts at a first point and ends at another point on the touch screen display.

8. The mobile terminal according to claim 7, wherein the controller is further configured to:

slidably move the graphic object in response to a touch and drag of the graphic object, and change sizes of the first and second regions based on the movement of the graphic object.

9. The mobile terminal according to claim 8, wherein the controller is further configured to:

stop partitioning the touch screen display into the first and second regions when the graphic object is moved to a predetermined region on the touch screen display, and display at least some of the list of items in a sequential order.

10. The mobile terminal according to claim 9, wherein the controller is further configured to display the items in the sequential order starting from a first item or starting from a last item based on a direction in which the graphic object is moved.

11. The mobile terminal according to claim 7, wherein the controller is further configured to partition the touch screen display into a third region based on a third touch input.

12. The mobile terminal according to claim 7, wherein the controller is further configured to:

move the items in both of the first and second regions based on a touch and drag input applied to the graphic object, and move only the items included in the respective first or second regions based on a touch and drag input to the respective first or second regions.

13. The mobile terminal according to claim 1, wherein the controller is further configured to:

receive a selection of any one of the items included in the first and second regions, display detailed information on the selected item, and return to displaying the first and second regions with the list of items in response to a control command.

14. The mobile terminal according to claim 13, wherein the controller is further configured to display the detailed information in the first region, and continue to display the at least one item in the second region.

15. A method of controlling a mobile terminal, the method comprising:

displaying, via a touch screen display of the mobile terminal, a first part of a list, wherein the first part comprises items included in the list;

sensing, via a controller of the mobile terminal, a predetermined-type first touch input with respect to the touch screen display;

partitioning, via the controller, the touch screen display into at least first and second regions in response to the first touch input, wherein a graphic object, discriminating the first and second regions and comprising an icon for controlling the first and the second regions, is displayed to a border region between the first and second regions in response to the first touch input;

displaying, via the touch screen display, at least some of the first part to the first region;

displaying, via the touch screen display, a second part of the list to the second region, wherein the second part of the list comprises at least a first item or a last item in the list;

sensing, via the controller, a predetermined-type second touch input different from the first touch input with respect to the touch screen display; determining, via the controller and in response to the second touch input, whether items included in the first and second regions are moved together or items included in one of the first and second regions are moved, depending on where the icon is positioned; and moving, via the controller, the items included in the first and second regions together or move the items included in the one of the first and second regions based on the determination related to the position of the icon wherein:

if the icon is positioned in the middle of the graphic object, the items included in the first and second regions are moved together, in response to the second touch input, if the icon is positioned toward the first region, the items included in the first region are not moved and only the items included in the second region are moved, in response to the second touch input, and if the icon is positioned toward the second region, the items included in the second region are not moved and only the items included in the first region are moved, in response to the second touch input, and wherein the position of the icon is changed by a third touch input with respect to the icon.

16. The method according to claim 15, wherein, if the items displayed on the first region correspond to an upper portion of the list, the method further comprises displaying said at least one other item including the last item in the list to the second region, and wherein, if the items displayed on the first region correspond to a lower portion of the list, the method further comprises displaying said at least one other item including the first item in the list to the second region.

17. The method according to claim 15, wherein, based on the second touch input, the method further comprises:

replacing at least one of the items included in the first region with a different item allocated to the first region but not displayed in the first region; and replacing at least one of the items included in second region with a different item allocated to the second region but not displayed in the second region, and wherein an amount of the different items as replacements in the first and second regions is determined depending on a touch direction of the second touch input.

18. The method according to claim 17, further comprising:

scrolling the items included in the first and second regions so as to move around in a circle within the list based on the second touch input.

19. The method according to claim 14, further comprising:

determining sizes of the first and second regions based on a position where the first touch input is sensed.

\* \* \* \* \*